(12) United States Patent
Stocker et al.

(10) Patent No.: US 12,475,024 B2
(45) Date of Patent: Nov. 18, 2025

(54) TEST AUTOMATION FOR ROBOTIC PROCESS AUTOMATION

(71) Applicant: UiPath, Inc., New York, NY (US)

(72) Inventors: Thomas Stocker, Gaishorn (AT); Gerd Weishaar, Vienna (AT)

(73) Assignee: UiPath, Inc., New York, NY (US)

(*) Notice: Subject to any disclaimer, the term of this patent is extended or adjusted under 35 U.S.C. 154(b) by 0 days.

(21) Appl. No.: 16/854,733

(22) Filed: Apr. 21, 2020

(65) Prior Publication Data
US 2021/0326244 A1   Oct. 21, 2021

(51) Int. Cl.
G06F 11/3668   (2025.01)

(52) U.S. Cl.
CPC ...... *G06F 11/3684* (2013.01); *G06F 11/3688* (2013.01); *G06F 11/3692* (2013.01); *G06F 11/3696* (2013.01)

(58) Field of Classification Search
CPC ... G06Q 10/0633; G06F 3/0482; G06F 9/455; G06F 9/451; G06F 11/3684; G06F 11/3688; G06F 11/369; G06F 11/3696
See application file for complete search history.

(56) References Cited

U.S. PATENT DOCUMENTS

| | | | |
|---|---|---|---|
| 8,826,084 B1 | 9/2014 | Gauf et al. | |
| 9,111,041 B1 | 8/2015 | Zhang et al. | |
| 10,019,344 B1 | 7/2018 | Chheda et al. | |
| 10,235,192 B2 | 3/2019 | Hall et al. | |
| 10,248,549 B1 | 4/2019 | Davies | |
| 10,289,524 B2 | 5/2019 | Kaulgud et al. | |
| 10,365,799 B2 | 7/2019 | Hosbettu et al. | |
| 11,106,569 B1 | 8/2021 | Chapagain et al. | |
| 2006/0195817 A1 | 8/2006 | Moon | |
| 2009/0019271 A1 | 1/2009 | Kawakami | |
| 2009/0070121 A1 | 3/2009 | Leonelli et al. | |
| 2009/0125362 A1* | 5/2009 | Reid | G06F 8/30 705/7.27 |
| 2013/0297678 A1 | 11/2013 | Schach et al. | |

(Continued)

FOREIGN PATENT DOCUMENTS

| | | |
|---|---|---|
| CN | 101933001 A | 12/2010 |
| CN | 103502952 A | 1/2014 |

(Continued)

OTHER PUBLICATIONS

Muhammad Nouman Zafar et al.; Towards a Workflow for Model-Based Testing of Embedded Systems; ACM; pp. 33-40; retrieved on Apr. 25, 2025 (Year: 2021).*

(Continued)

*Primary Examiner* — S. Sough
*Assistant Examiner* — Cuong V Luu
(74) *Attorney, Agent, or Firm* — LeonardPatel PC; Sheetal S. Patel; Michael A. Leonard, II

(57) ABSTRACT

Test cases for existing workflows (or workflows under test) may be created and executed. A test case may be created for a workflow in production or one or more parts of the workflow, and the created test case for the workflow, or the one or more parts of the workflow, may be executed to identify environmental and/or automation issues for the workflow. A failed workflow test may be reported when the environmental and/or automation issues are identified.

20 Claims, 35 Drawing Sheets

(56) References Cited

U.S. PATENT DOCUMENTS

| | | | |
|---|---|---|---|
| 2016/0004622 A1* | 1/2016 | Kaulgud | G06F 11/3684 |
| | | | 717/132 |
| 2016/0055077 A1 | 2/2016 | Baloch et al. | |
| 2016/0202962 A1 | 7/2016 | Arif et al. | |
| 2016/0283293 A1 | 9/2016 | Goel et al. | |
| 2017/0024312 A1 | 1/2017 | Salame | |
| 2017/0052824 A1 | 2/2017 | Sharma et al. | |
| 2018/0197123 A1 | 7/2018 | Parimelazhagan et al. | |
| 2018/0203994 A1 | 7/2018 | Shukla et al. | |
| 2018/0370029 A1 | 12/2018 | Hall et al. | |
| 2018/0370033 A1 | 12/2018 | Geffen et al. | |
| 2019/0052551 A1 | 2/2019 | Barczynski et al. | |
| 2019/0129827 A1 | 5/2019 | Ramasamy et al. | |
| 2019/0163616 A1* | 5/2019 | Govindaraju | G06F 11/3688 |
| 2019/0171513 A1 | 6/2019 | Parushothaman | |
| 2019/0294531 A1 | 9/2019 | Avisror et al. | |
| 2019/0303274 A1 | 10/2019 | Funnell et al. | |
| 2020/0174917 A1* | 6/2020 | Patel | G06F 11/3684 |
| 2020/0184272 A1* | 6/2020 | Zhang | G06N 20/00 |
| 2020/0319995 A1 | 10/2020 | Mitra | |

FOREIGN PATENT DOCUMENTS

| | | | |
|---|---|---|---|
| CN | 105930276 | A | 9/2016 |
| CN | 110515846 | A | 11/2019 |
| CN | 110795332 | A | 2/2020 |
| GB | 2524737 | A | 10/2015 |
| JP | 2010218533 | A | 9/2010 |
| JP | 2018010681 | A | 1/2018 |
| JP | 2018189641 | A | 11/2018 |
| JP | 2019534523 | A | 11/2019 |
| KR | 101335912 | B1 | 12/2013 |
| KR | 101826618 | B1 | 2/2018 |
| WO | 2019148481 | A1 | 12/2009 |

OTHER PUBLICATIONS

Puram, Akshita Deora, "What End-to-End Test Automation for Behavior-Driven Development Looks Like", https://smartbear.com/blog/test-and-monitor/native-test-automation-bdd/, [2019]

Test Automation in Production Environment, CloudQA, https://cloudqa.io/test-automation-in-production-environment, [2020].

Gupta, Lokesh, "Test NG—Test Groups, Meta Group, Default Group Examples", https://howtodoinjava.com/testng-test-groups-meta-group-default-group-examples/, [2016].

CloudQA Test Suite Management Page available at https://doc.cloudqa.io/TestsuiteManagement.html (last accessed Sep. 11, 2020).

Andres Jiménez-Ramírez et al., Automated testing in robotic process automation projects, Journal of Software: Evolution and Process, e2259, pp. 1-11, Mar. 17, 2020 [retrieved on Dec. 23, 2020].

International Search Report & Written Opinion, issued Jan. 19, 2021, PCT Application No. PCT/US20/51508.

International Search Report & Written Opinion, issued Jan. 20, 2021, PCT Application No. PCT/US20/51496.

Cuong V Luu, "Non-Final Office Action", issued Jun. 11, 2021, U.S. Appl. No. 16/855,563.

Chacon Montero Jesus et al: "Towards a Method for Automated Testing in Robotic Process Automation Projects", 2019 IEEE/ACM 14th International Workshop on Automation of Software Test (AST), IEEE, May 27, 2019 (May 27, 2019), pp. 42-47, XP033611713.

European Search Report, issued Jan. 21, 2021, EP Patent Application No. 20200736.5.

European Search Report, issued Jan. 22, 2021, EP Patent Application No. 20200826.4.

Cuong V Luu, "Final Office Action", issued Oct. 4, 2021, U.S. Appl. No. 16/855,563.

Cuong V Luu, "Non-Final Office Action", issued Jan. 12, 2022, U.S. Appl. No. 16/855,563.

Office Action issued Oct. 28, 2021, KR Patent Application No. 10-2020-7028236.

Notice of Allowance, issued Jun. 1, 2022, KR Patent Application No. 10-2020-7028236.

Office Action, issued May 10, 2022, KR Patent Application No. 10-2020-7028233.

Final Office Action, issued Apr. 12, 2022, KR Patent Application No. 10-2020-7028236.

Office Action, issued Feb. 22, 2022, KR Patent Application No. 10-2020-7028233.

Cuong V Luu, "Final Office Action", issued Apr. 4, 2022, U.S. Appl. No. 16/855,563.

Cuong V Luu, "Non-Final Office Action", issued Oct. 12, 2022, U.S. Appl. No. 16/855,563.

Notice of Allowance, issued Aug. 5, 2022, KR Patent Application No. 10-2020-7028233.

Cuong V Luu, "Final Office Action", issued Jan. 9, 2023, U.S. Appl. No. 16/855,563.

Andreas Bauer et al.; We Tried and Failed: An Experience Report on a Collaborative Workflow for GUI-based Testing; IEEE; 9 pages; retrieved on Jun. 27, 2023 (2023).

Cassio Prazeres et al.; Semantic Web Services discovery and composition: paths along workflows; IEEE; pp. 58-65; retrieved on Jul. 27, 2023. (Year: 2009).

Chengying Mao et al.; Workflow-based Testing Process Management of Software Project; IEEE; pp. 4950-4953; retrieved on Jun. 27, 2023 (2007).

Cuong V Luu, "Notice of Allowance", issued Aug. 30, 2023, U.S. Appl. No. 16/855,563.

Cuong V Luu, "Notice of Allowance", issued Sep. 7, 2023, U.S. Appl. No. 17/670,061.

Parham Porouhan et al.; Workflow Mining: Discovering Process Patterns & Models from MXML Logs; IEEE; pp. 118-125; retrieved on Jul. 27, 2023 (Year: 2023).

Cuong V Luu, "Non-Final Office Action", issued May 1, 2023, U.S. Appl. No. 16/855,563.

Notification of Reasons for Refusal, issued Oct. 3, 2024, JP Patent Application No. 2020-553453.

Examination Report, issued Dec. 18, 2024, EP Patent Application No. 20200736.5.

Notification of Reasons for Refusal, issued Nov. 1, 2024, JP Patent Application No. 2020-553463.

Office Action, issued Dec. 3, 2024, EP Patent Application No. 20200826.4.

Office Action, issued Nov. 12, 2024, CN Patent Application No. 202080002313.4.

Office Action, issued Oct. 12, 2024, CN Patent Application No. 202080002317.2.

Notice of Allowance, issued Apr. 16, 2025, JP Patent Application No. 2020-553463.

\* cited by examiner

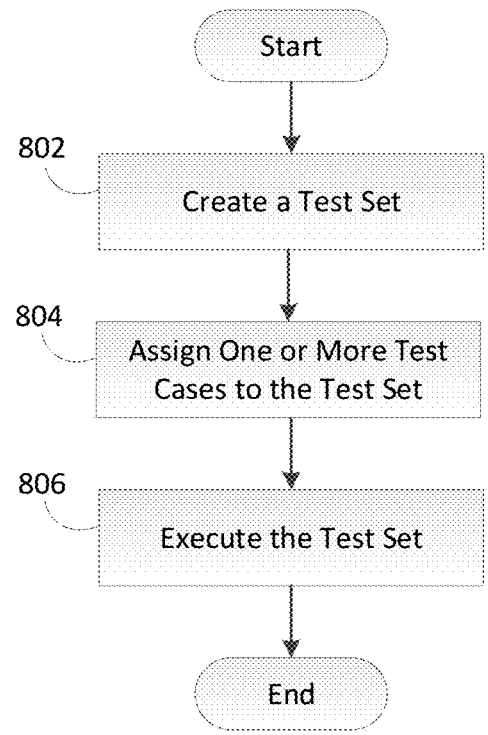
Fig. 8

| Main | | | | | | Expand All | Collapse All |
|---|---|---|---|---|---|---|---|

○ Monitoring        Case Number   VI-190511

○ Robots

○ Machines    ☐ Test Case ▽   Description ▽   Project ▽ Limited Process▽ Created ▽ Updated ▽

⬤ Test Cases

☐   Enter Vehicle Data Test

○ Test Sets

☐   Enter Product Data Test

○ Text Executions

☐   Select Price Option Test

○ Schedules

○ Libraries       ☐   Send Quote Test

○ Assets         ☐   Create Insurance Quote E2E Test

○ Queues

2400

| Make | Performance | Construction | Seat |
|---|---|---|---|
| Audi | 200 | 12/28/2010 | 4 |
| Mercedes | 225 | 7/22/2002 | 5 |
| Skoda | 75 | 8/17/2008 | 5 |
| Fiat | 90 | 2/3/2008 | 4 |
| | | | |
| | | | |
| | | | |
| | | | |
| | | | |
| | | | |
| | | | |
| | | | |
| | | | |

Vehicle Data | Insurant Da. | Product Da.

| | Make | Perf. | DD/MM/YY | # Of Seats |
| | Audi | 200 | 12/12/2010 | 4 |
| | Mercedes | 250 | 02/05/2018 | 5 |
| | Skoda | 70 | 01/10/2010 | 5 |
| | Fiat | 50 | 23/08/2017 | 3 |

Main | Expand All | Collapse All
Start

| Main | Expand All | Collapse All |

Deploy Process

Package Name ⌄

Display Name

Package Version ⌄

Environment ⌄

Job Priority

Description

Input values          Output Values

Parameters            Value

[ Cancel ]  [ Create ]

| Main | | | | Expand All | Collapse All |
|---|---|---|---|---|---|
| | Default Test Cases | | | | |
| | Test Case | Project | App Version | | |
| | | REF_UiBankDemo | 3.0 | | |
| | | REF_UiBankDemo | 3.0 | | |
| | | REF_UiBankDemo | 3.0 | | |
| | | REF_UiBankDemo | 3.0 | | |
| | | REF_UiBankDemo | 3.0 | | |

TEST AUTOMATION FOR ROBOTIC PROCESS AUTOMATION

FIELD

The present invention generally relates to robotic process automation (RPA), and more specifically, to RPA for workflow in production testing.

BACKGROUND

Digital transformation requires businesses to continuously exploit digital technologies to create new sources of customer value and increase operational agility in service of customers. For example, wherever possible, the application of software and automation is implemented to reduce cost and time to market.

Process automation plays a key role in this transformation as it has the potential to substantially increase efficiency, and therefore, create a competitive advantage. For instance, RPA represents a rather new market, being around just for a few years. RPA has profited from a quick adoption by enterprise customers, resulting in the creation of thousands of bots for automating processes.

However, a lot of those bots may stop working for various reasons. For example, the low stability of bots is due to application changes, environment changes and fragile automation itself. Unlike other automation areas, such as test automation that has been around for 20 plus years, RPA did not have to deal with maintenance, and implementations often focused on happy paths rather than resilience and exception handling. While this issue has been partially addressed by applying best practices and tool support for exception handling and debugging, considering a high-level view on automation quality and digital transformation, a platform that addresses maintenance in several areas is needed.

SUMMARY

Certain embodiments of the present invention may provide solutions to the problems and needs in the art that have not yet been fully identified, appreciated, or solved by current RPA technologies. For example, some embodiments of the present invention pertain to creating and executing test cases for existing workflows (or workflows under test.

In an embodiment, a computer-implemented method includes creating one or more test cases for a workflow in production or one or more parts of the workflow. The method also includes executing the test case for the workflow, or the one or more parts of the workflow, to identify environmental and/or automation issues for the workflow. The method further includes reporting a failed workflow test when the environmental and/or automation issues are identified.

In another embodiment, a computer-implemented method includes creating a test case and assigning one or more test cases for a corresponding one of a plurality of workflows in production to the test set. The method also includes executing the test set to identify environmental and/or automation issues for each of the one or more test cases. The method further includes reporting a result of the test set. The result includes one or more failed test cases with a message notifying a user of the one or more failed test cases.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 8 is a flow diagram illustrating a process for executing a test case, according to an embodiment of the present invention.

FIG. 19 is a GUI illustrating test cases section having a column for 'Linked Process', according to an embodiment of the present invention.

FIG. 31 is a GUI illustrating a test case with multiple test data variations, according to an embodiment of the present invention.

FIG. 34 is a GUI illustrating a deployment process, according to an embodiment of the present invention.

FIG. 35 is a GUI illustrating the created test cases in the 'Test Case' section, according to an embodiment of the present invention.

DETAILED DESCRIPTION OF THE EMBODIMENTS

Some embodiments pertain to creating and executing test cases for existing workflows (or workflows under test). For example, some embodiments provide a solution for common functional application testing, i.e., to test an application directly within development. This allows a developer to catch application changes early on, and populate required adaptions for RPA. Some additional embodiments may provide a solution for functional workflow testing, i.e., testing automated workflows within IT-hosted test environments to catch automation issues and environmental changes (e.g., operating system updates, updated to the environment, or Microsoft Windows® updates) before the application is in production, and populate required adaptions for RPA.

It should be appreciated that the need for testing automated workflows has been recognized. There have been several internal and external initiatives that tried to provide solutions for testing automated workflows, such as RE-framework, which provides an infrastructure for Unit Testing, or the UiPath® functional testing of workflows.

Some embodiments provide a solution to the deficiencies of previously initiatives. For example, some embodiments allow for the creation of test cases for existing workflows or parts of the existing workflows. These test cases may be frequently executed to catch environmental and automation issues. When a failing workflow is identified, the RPA developer is notified. In some additional embodiments, data-driven workflow test cases are created so a data set can be injected from an external source. This data set may include Excel JSON, DB, to name a few. These embodiments may reduce the manual effort to create automated workflow test cases.

Figure 1:
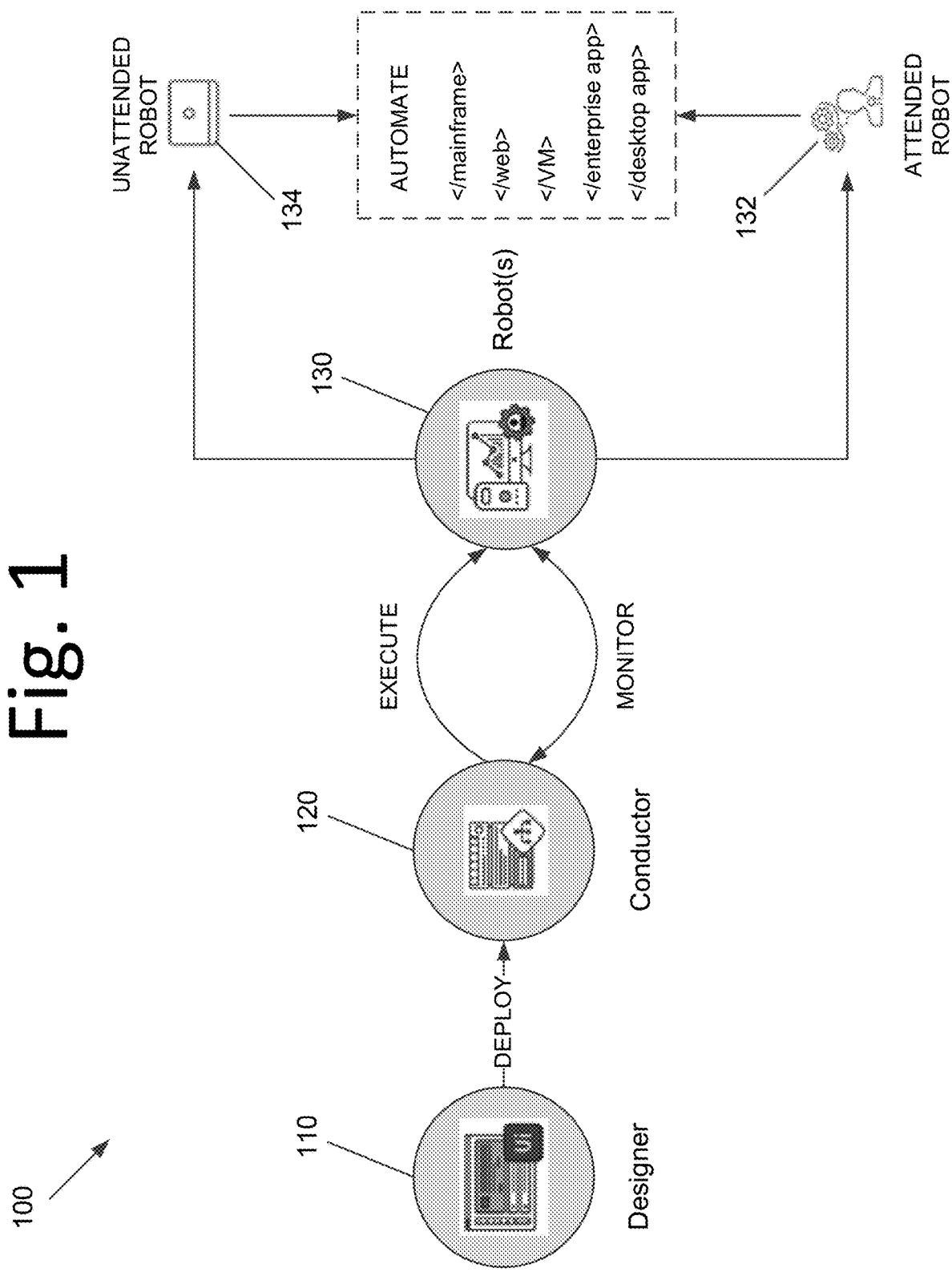
FIG. 1 is an architectural diagram illustrating an RPA system, according to an embodiment of the present invention.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
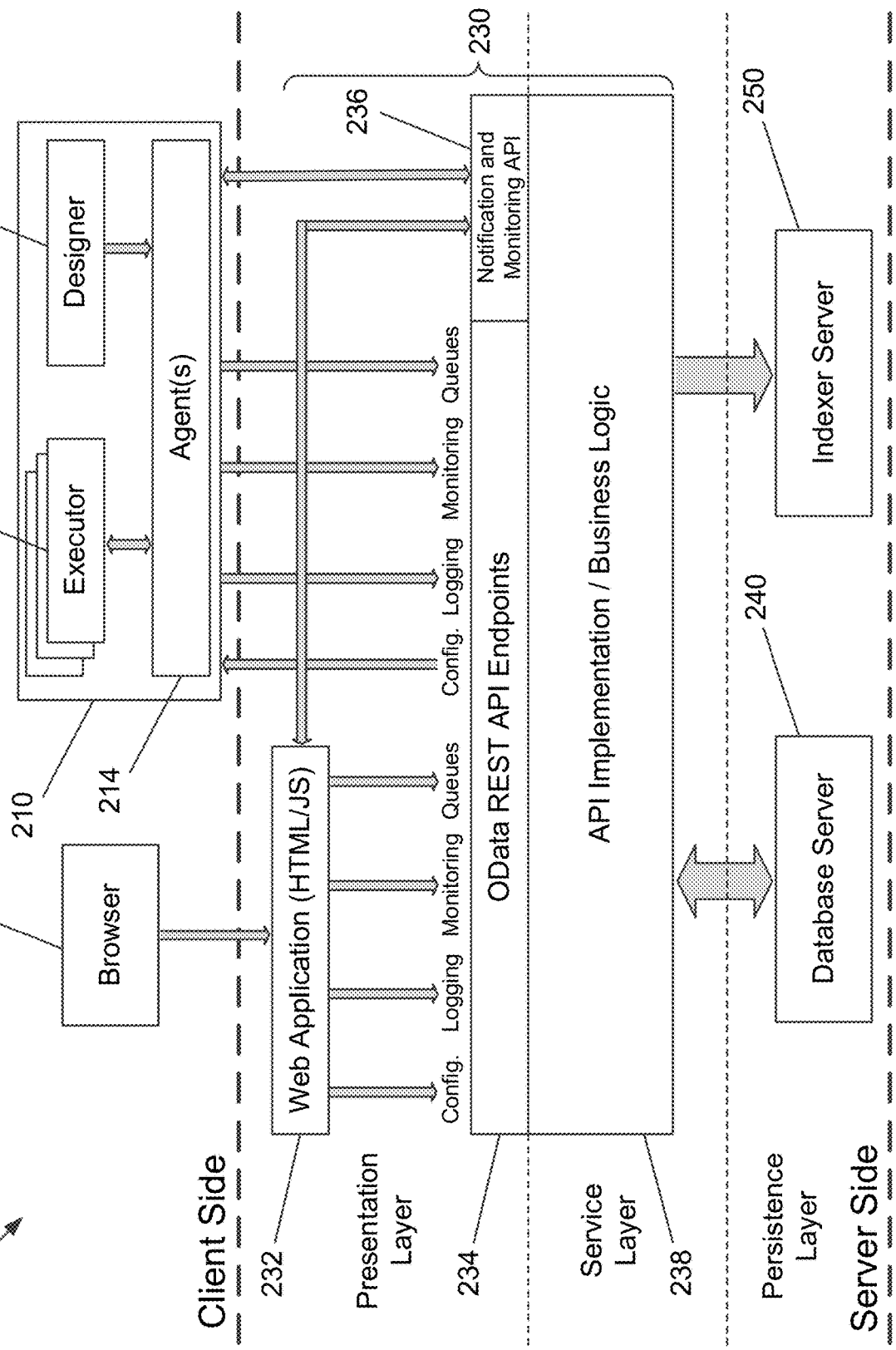
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS).

However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use Web Socket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
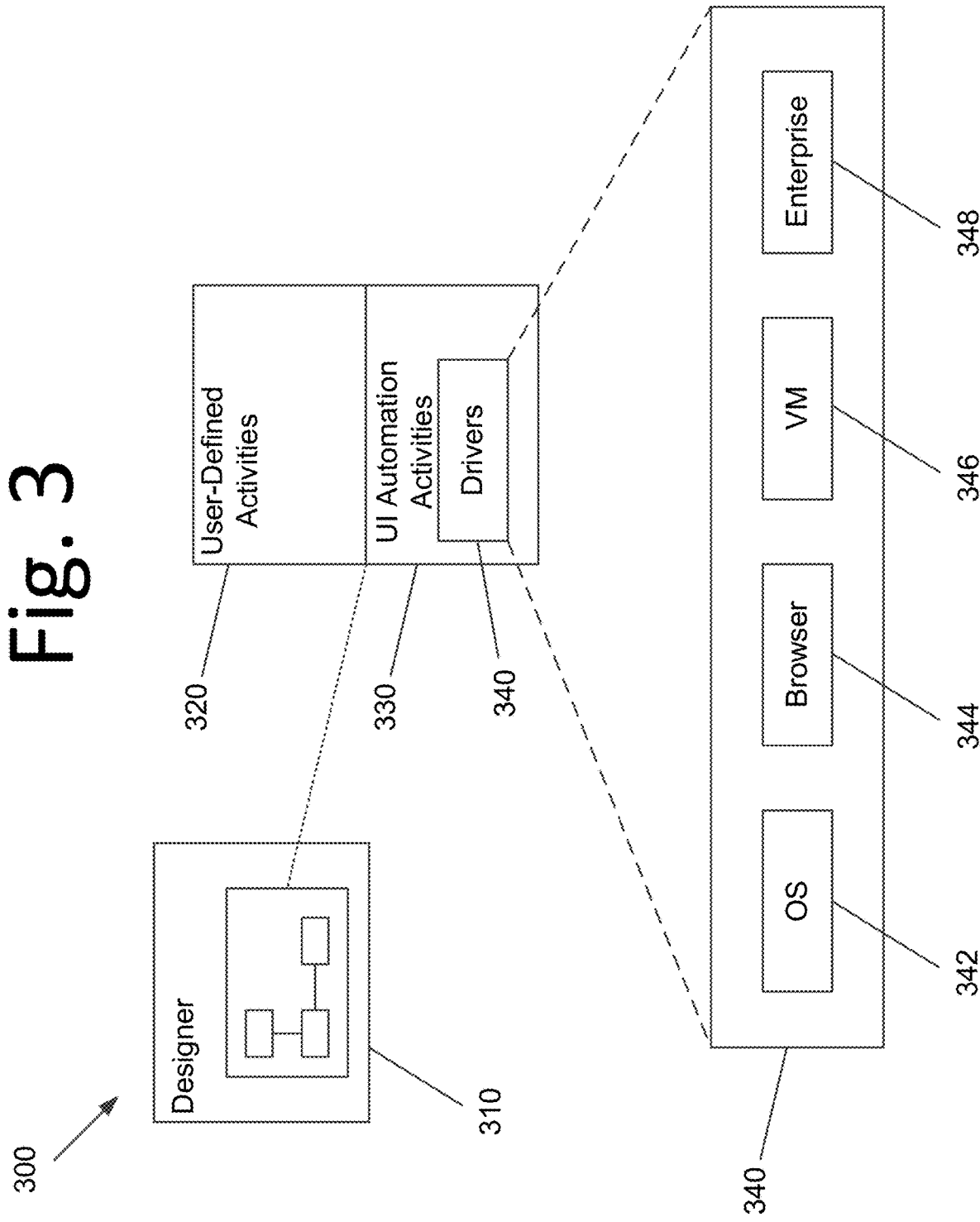
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, and drivers 340, according to an embodiment of the present invention. Per the above, a developer uses designer 310 to develop workflows that are executed by robots. Workflows may include user-defined activities 320 and UI automation activities 330. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 that allow the robot to interact with the desired software. For instance, drivers 340 may include OS drivers 342, browser drivers 344, VM drivers 346, enterprise application drivers 348, etc.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
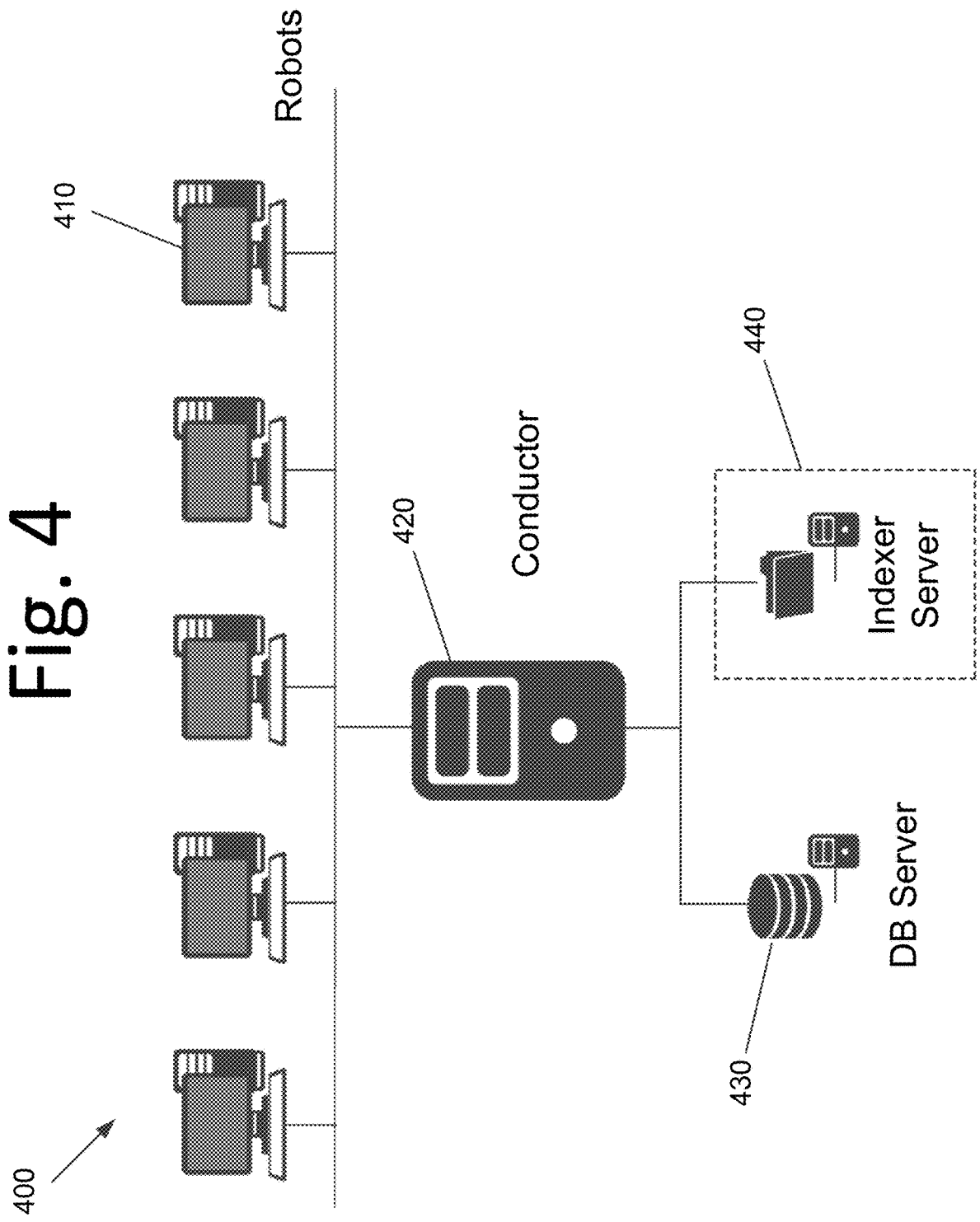
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
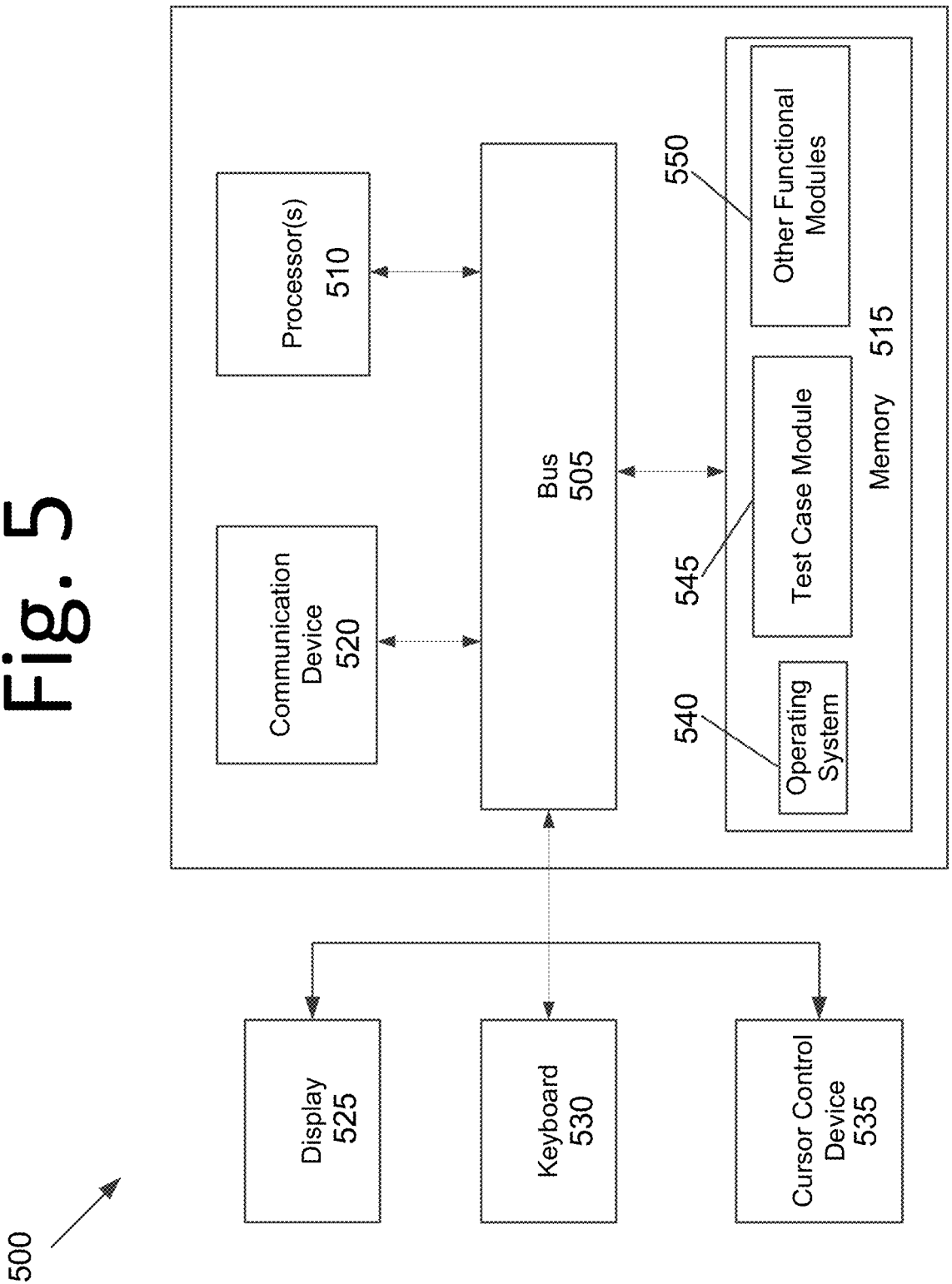
FIG. 5 is an architectural diagram illustrating a computing system configured to create and publish one or more test cases, according to an embodiment of the present invention.

FIG. 5 is an architectural diagram illustrating a computing system 500 configured to create and publish one or more test cases, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and/or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a test case module 545 that is configured to perform all, or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Test Case Creation

Figure 6:
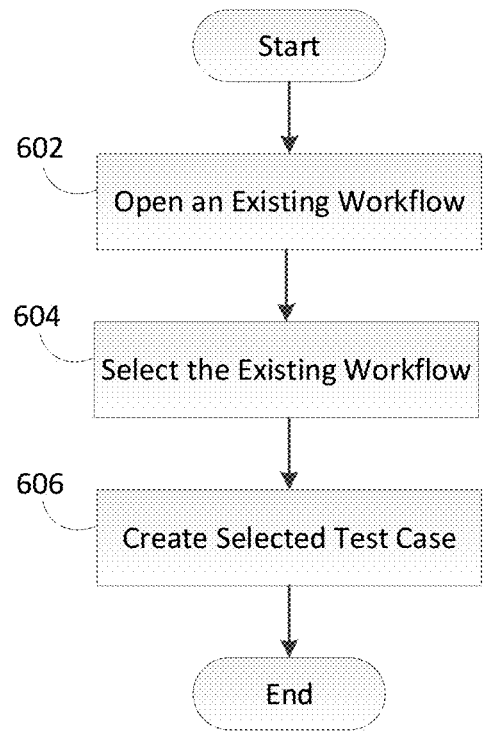
FIG. 6 is a flow diagram illustrating a process for creating a test case, according to an embodiment of the present invention.
Figure 10:
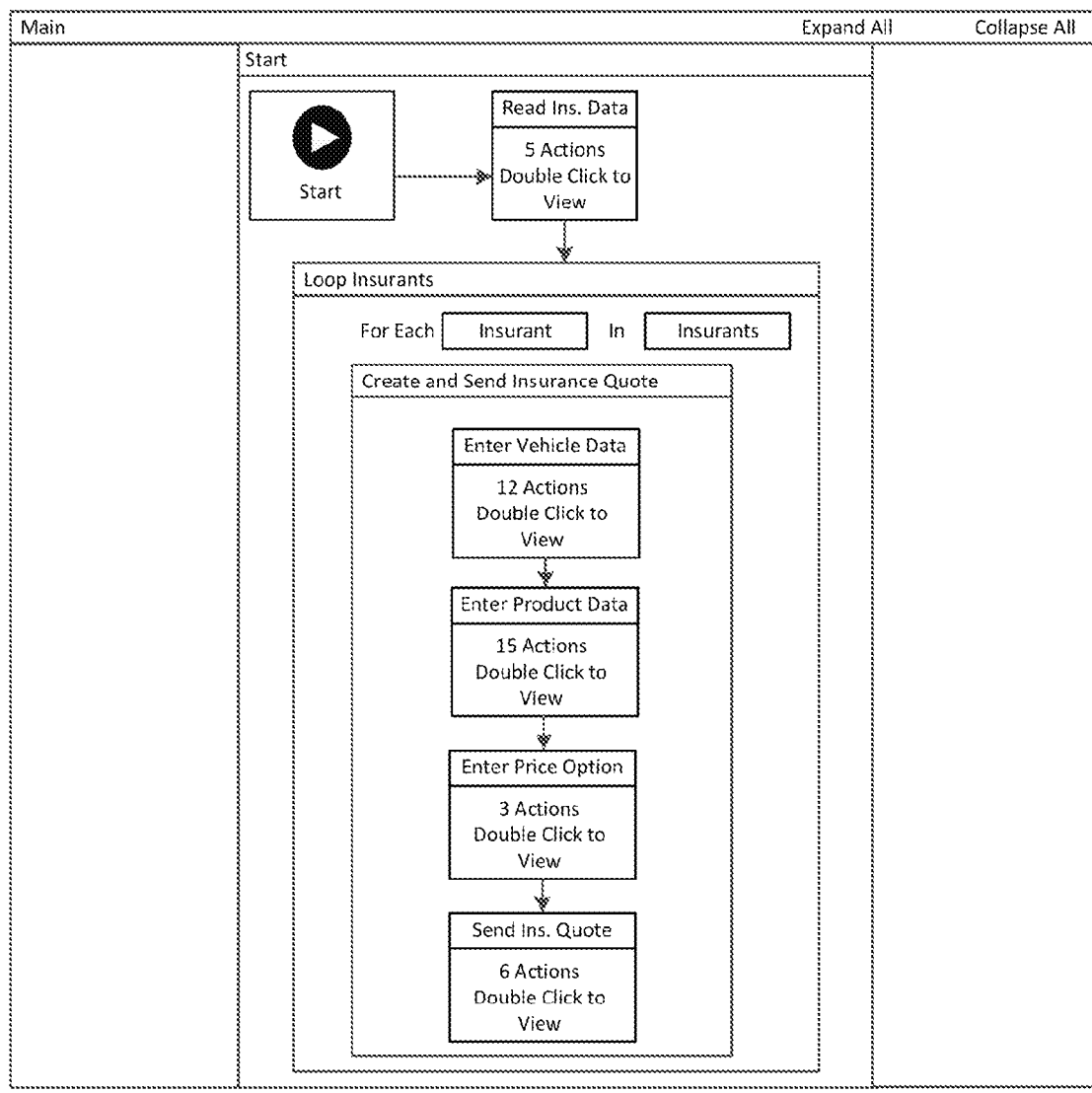
FIG. 10 is a graphical user interface (GUI) illustrating a workflow being selected in Studio Pro™, according to an embodiment of the present invention.

FIG. 6 is a flow diagram illustrating a process 600 for creating a test case, according to an embodiment of the present invention. In some embodiments, process 600 begins at 602 with opening an existing workflow with Studio Pro™. As noted above, the existing workflow may be a workflow in production or under development. At 604, the existing workflow is selected to determine the scope of the workflow test case. Depending on the embodiment, either the entire workflow or one or more portions of the workflow are selected. See FIG. 10, which is a GUI 1000 illustrating a workflow being selected in Studio Pro™, according to an embodiment of the present invention.

At 606, the selected test case is created. For example, the selected test case is created when the user of the computing device selects the 'Create Test Case' button from the context menu of a workflow. The created test case may be stored under the 'Test Cases' folder of the project.

Figure 11:
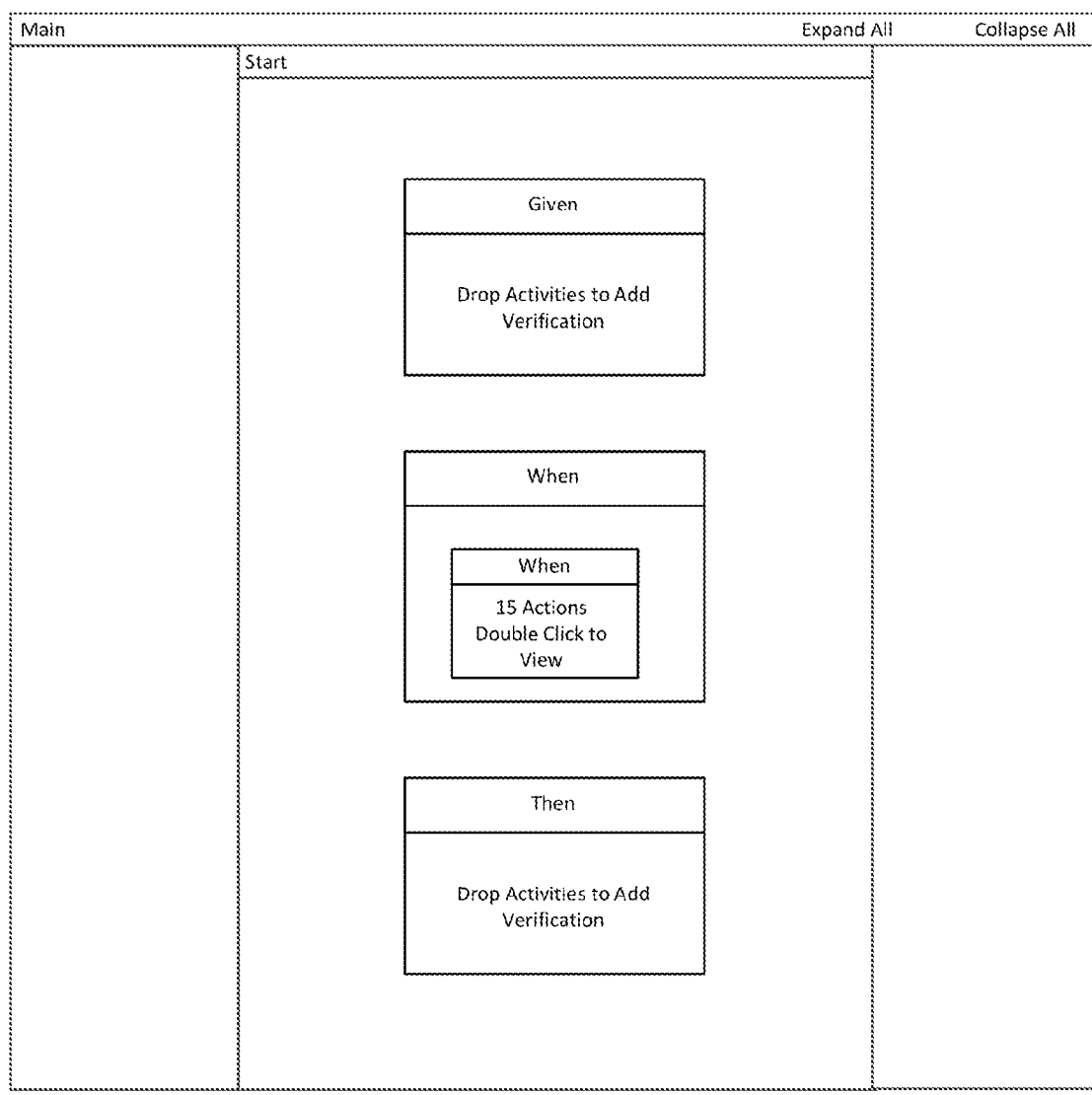
FIG. 11 is a GUI illustrating a 'given-when-then' template, according to an embodiment of the present invention.
Figure 12:
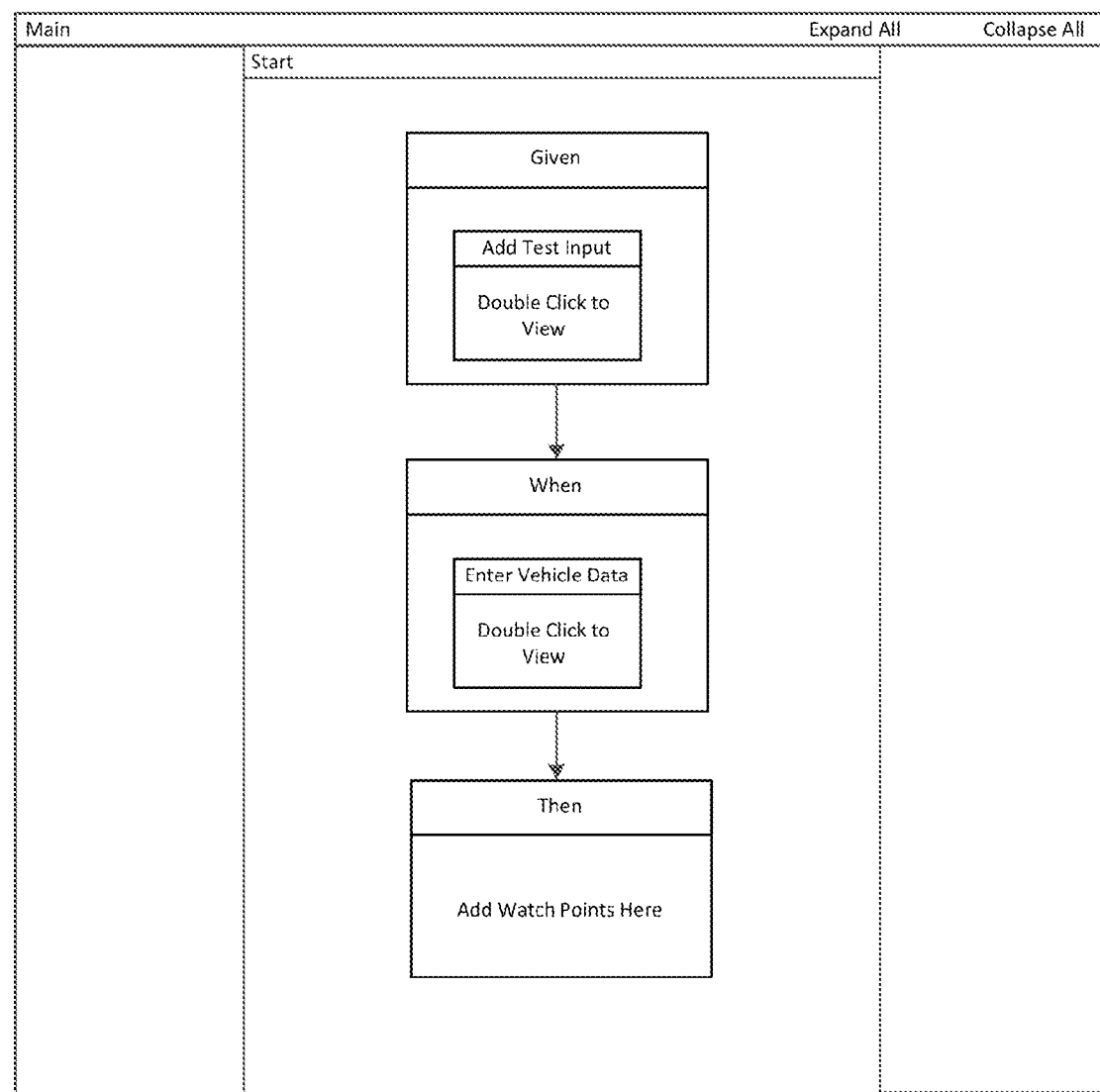
FIG. 12 is a GUI illustrating a 'when' module, according to an embodiment of the present invention.

In some embodiment, the test case uses a 'given-when-then' template or module. See FIG. 11, which is a GUI 1100 illustrating a 'given-when-then' template, according to an embodiment of the present invention. Under the 'when' module, the workflow under test is invoked, and therefore, placed as a reference. The idea is, that the test case does not hold a copy of the workflow under test, but rather directly references it. This is important, because the workflow under test may change over time. The 'when' module is primarily responsible for executing or invoking the workflow that is under test. See, for example, FIG. 12, which is a GUI 1200 illustrating a 'when' module, according to an embodiment of the present invention.

Figure 13:
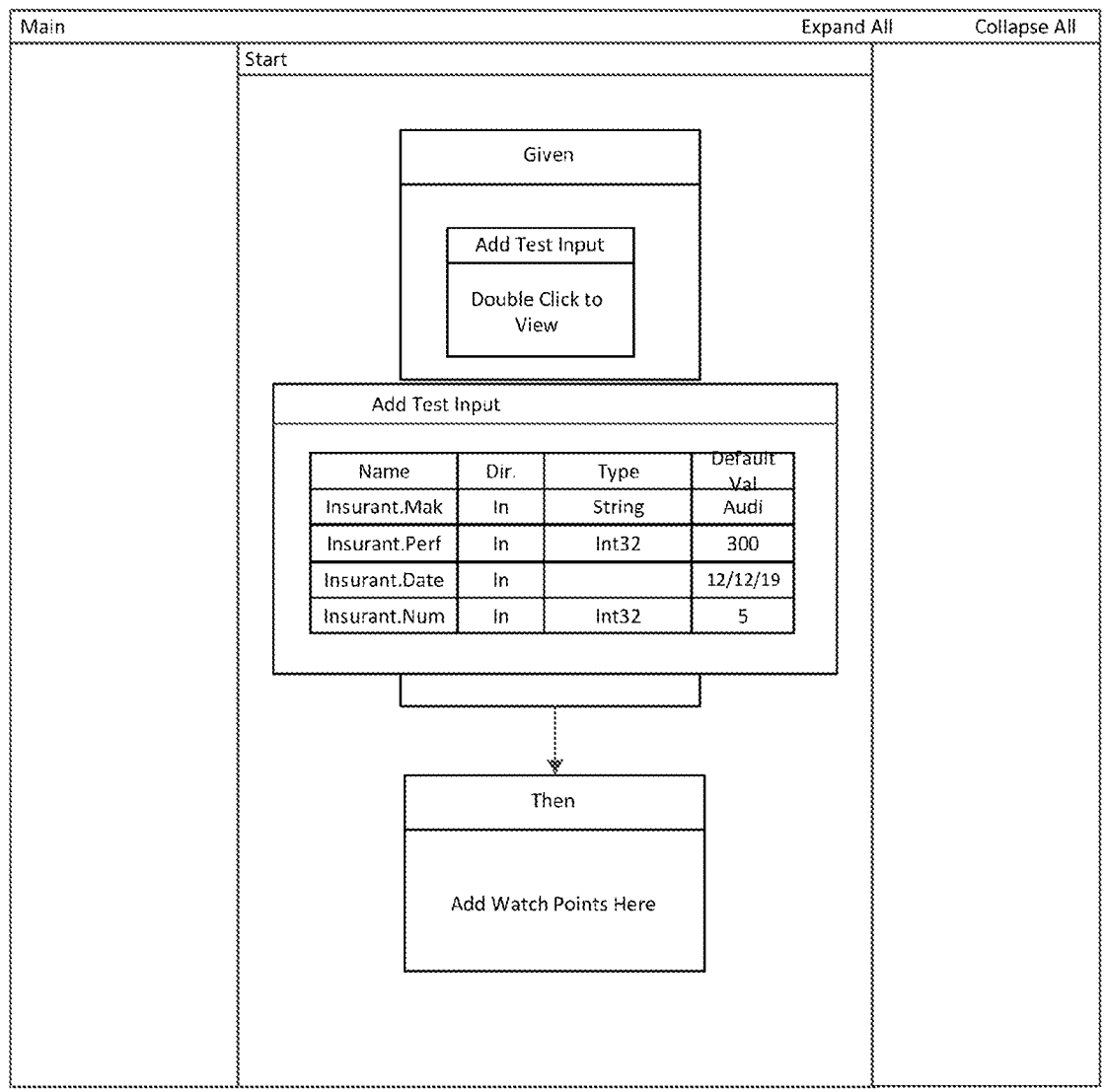
FIG. 13, which is a GUI illustrating preconditions entered in the 'given' module, according to an embodiment of the present invention.
Figure 14:
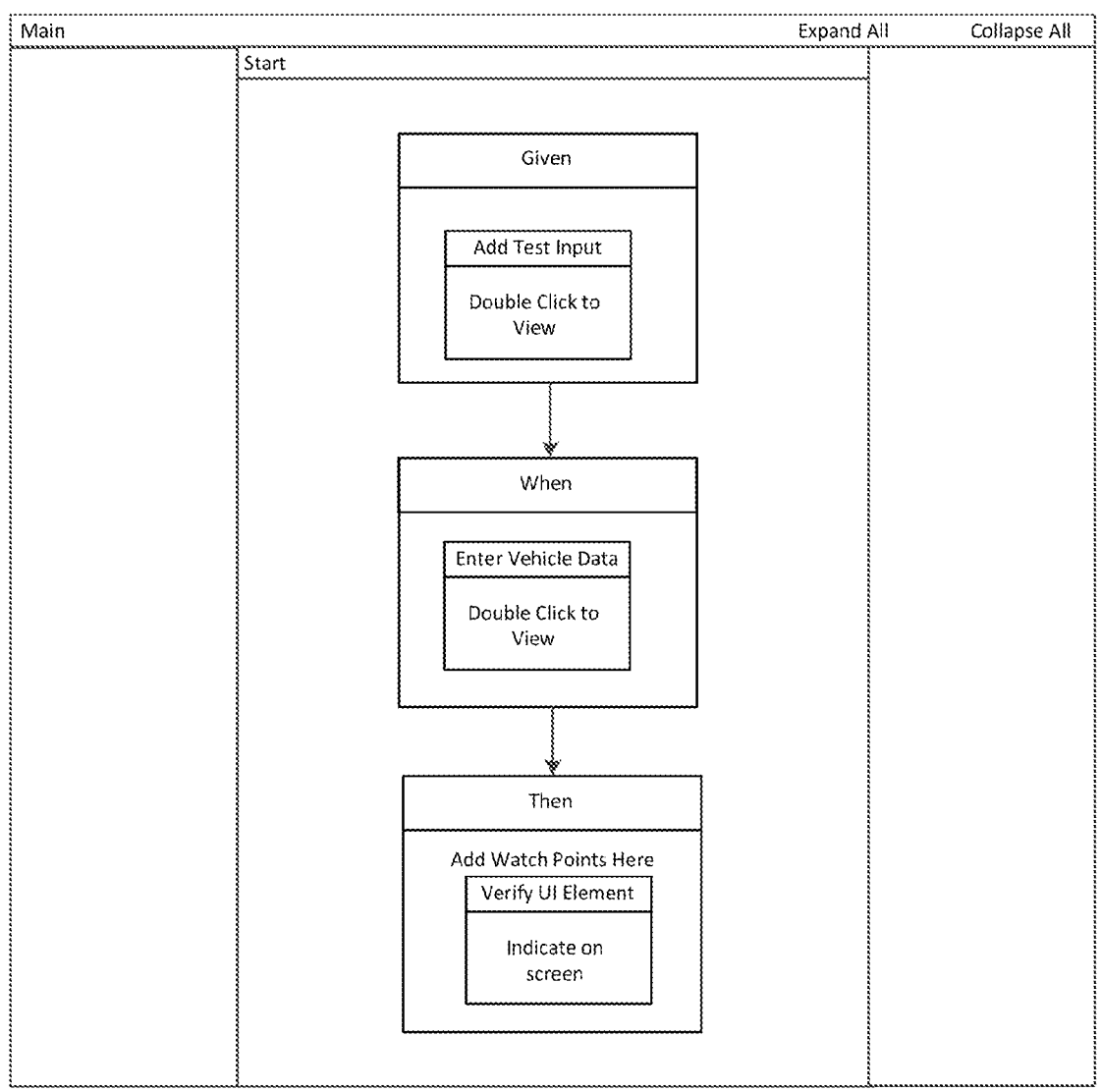
FIGS. 14 and 15 are GUIs illustrating the mocking of the workflow under test, according to an embodiment of the present invention.
Figure 15:
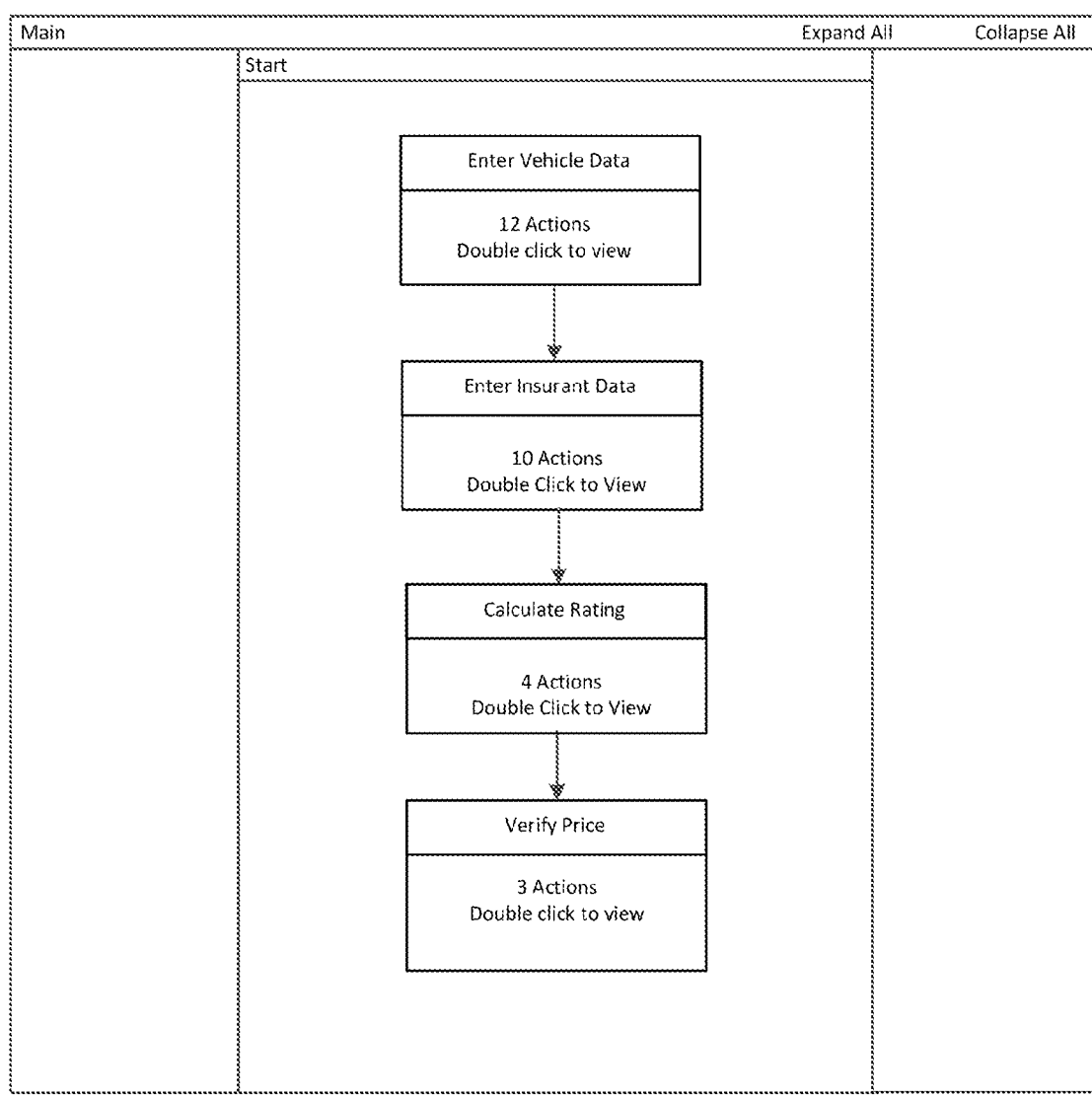

Under the 'given' module, the user of the computing device adds all required preconditions for the 'when' module to successfully execute. See FIG. 13, which is a GUI 1300 illustrating preconditions entered in the 'given' module, according to an embodiment of the present invention. For example, the required preconditions may include input parameters, applications, etc. The 'given' module may provide an execution environment, which ensures that the workflow runs successfully. This might include, for example, providing temporary files for the workflow to process (e.g., instead of real invoices), starting a certain application that is required for the workflow to run, or parameters and variables that are used within the workflow and that are expected as input for the workflow (e.g., an id or credentials). In some further embodiments, the 'given' module is configured to provide a possibility to mock steps of a workflow under test, ensuring that the workflow under test is executed without errors. The mocking includes simulating a series of steps within the workflow under test. See, for example, FIGS. 14 and 15, which are GUIs 1400, 1500 illustrating the mocking of the workflow under test, according to an embodiment. In some embodiments, the workflow under test is a test object for which you create test cases for, and is invoked by the 'when' module.

Further, under the 'given' module, the variables and/or parameters required for the workflow are automatically identified. In certain embodiments, the user may place any activities and/or actions in the 'given' module. Additionally, arguments/parameters can directly be provided in the 'when' module on the 'Invoke Workflow' activity, which references the workflow under test.

In one example, the workflow under test uses a variable 'Insurant.Name', which is part of a Data Driven Test Case (DDT). In some embodiments, DDTs are represented by a single test case definition, which is filled up with different data variations. Those variations may come from, for example, an Excel® file, and if such a data file is linked, arguments are created for each table column of the data source. When the test case is created, a variable with the same name is automatically created in the 'given' module. In another example, a default value of the original 'Insurant-.Name' variable is given when available. Otherwise, the variable is left for the user of the computing device to complete the value.

Figure 16:
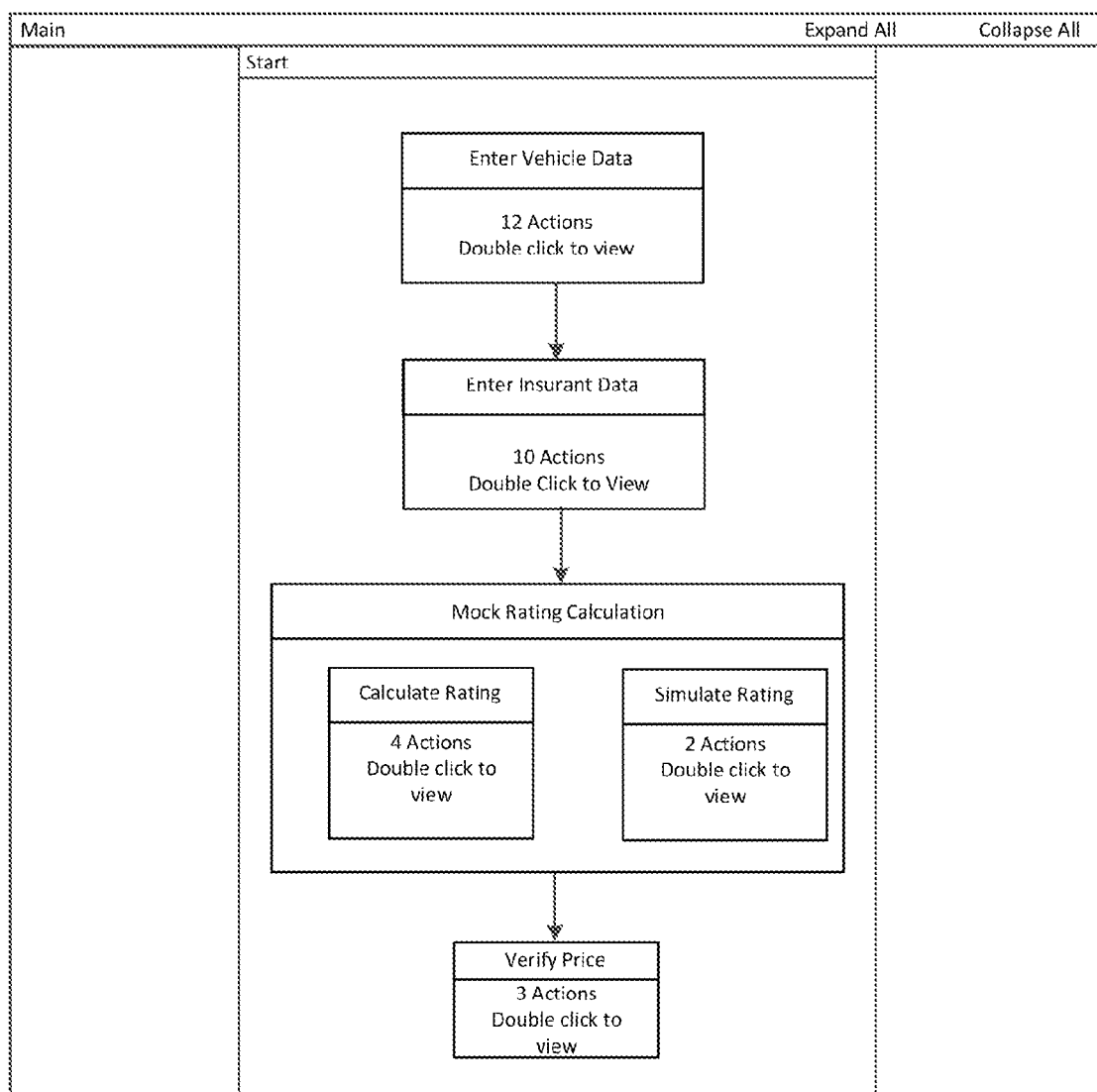
FIG. 16 is a GUI illustrating a 'then' module, according to an embodiment of the present invention.
Figure 17:
FIGS. 17 and 18 are GUIs illustrating an executed workflow, according to an embodiment of the present invention.
Figure 18:
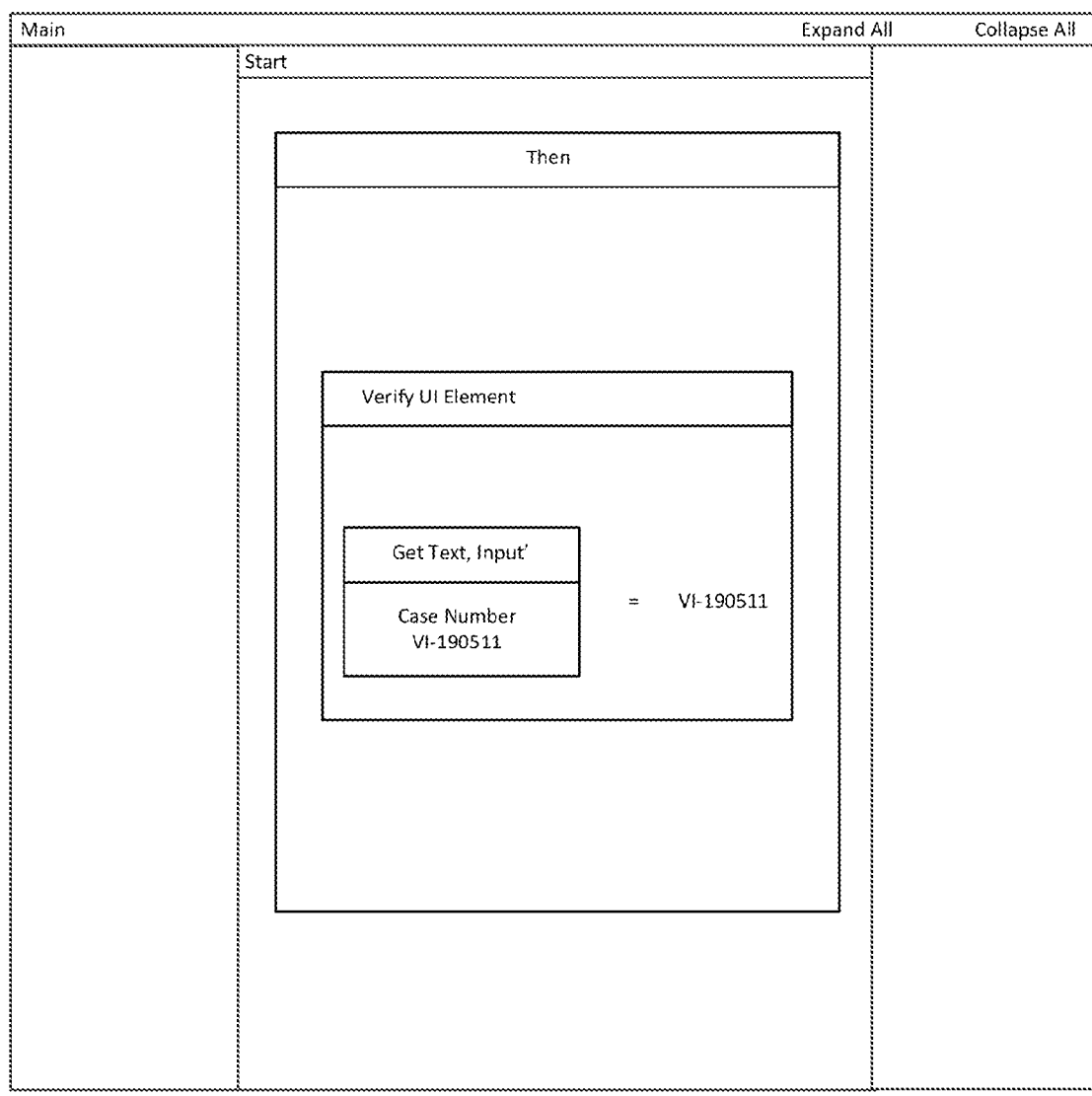

Under the 'then' module, this module may hold any types of assertions, which represent an essential part of the test case. For purposes of explanation, essential part of the test case is the assertion or verification, it defines the test purpose (e.g., assert that the loan value is 500,000). This is how a test case proves that a certain requirement of the application under test is fulfilled. With the 'then' module, existing verification activities may be dragged into the 'then' section of the module by the user of the computing device. In one example, within the 'when' module, the user of the computing device may invoke a workflow that fills out an insurance application. See FIG. 16, which is a GUI 1600 illustrating a 'then' module, according to an embodiment of the present invention. Within the 'then' module, the user of the computing device may drag a 'Verify UiElement' activity to assert the created insurance number. See FIGS. 17 and 18, which are GUIs 1700 and 1800 illustrating an executed workflow, according to an embodiment of the present invention.

Test Case Publication

A Studio Pro™ project may hold 1-n workflows, 1-n workflow test cases, and 1-n application test cases. When publishing, 'Test Cases' section of Orchestrator™ may contain a project, application test cases, and/or workflow test cases. Workflow test cases may additionally contain a reference to the original workflow that it was created for. See, for example, FIG. 19, which is a GUI 1900 illustrating test cases section having a column for 'Linked Process', according to an embodiment of the present invention.

Figure 7:
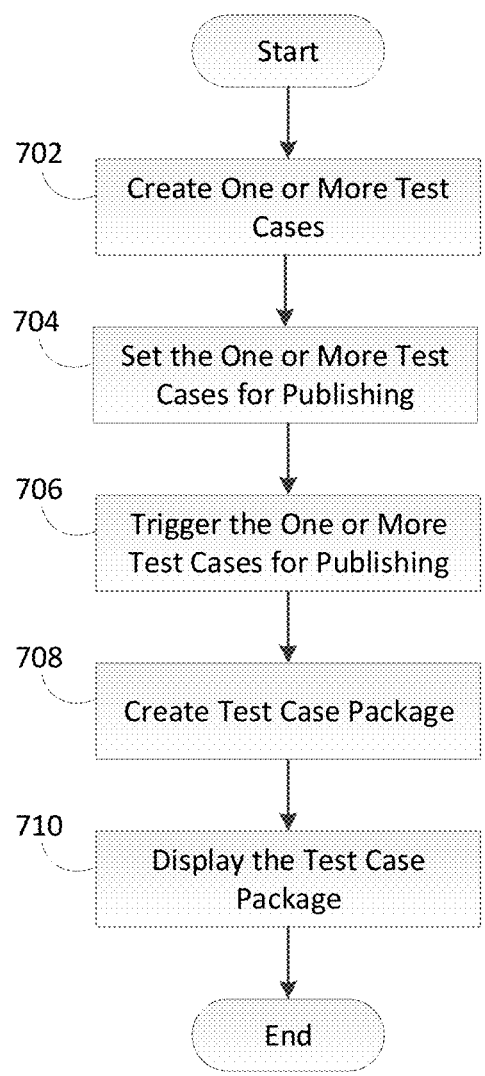
FIG. 7 is a flow diagram illustrating a process for publishing a test case, according to an embodiment of the present invention.
Figure 32:
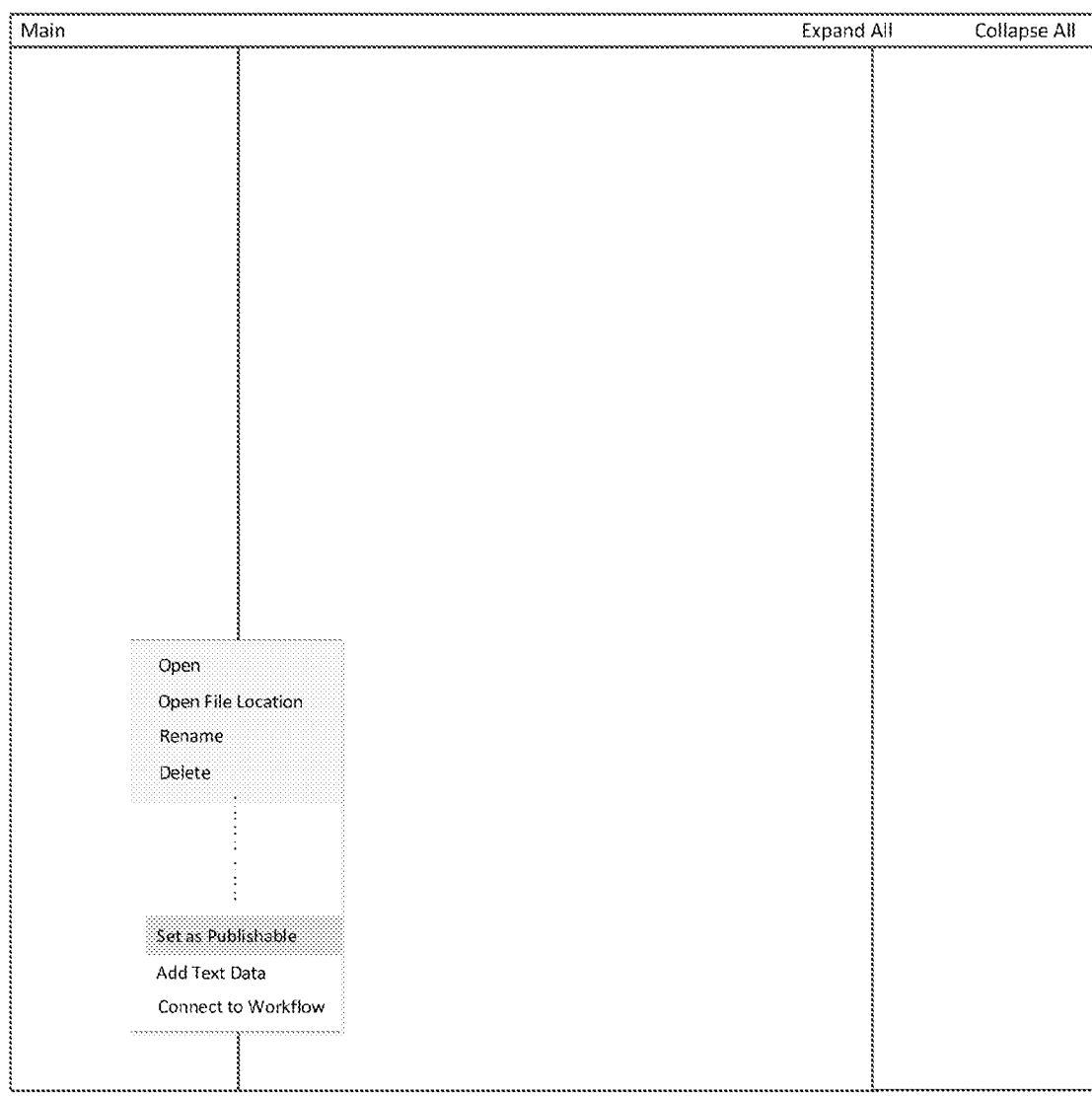
FIG. 32 is a GUI illustrating a menu option to set the one or more test cases to be publishable, according to an embodiment of the present invention.
Figure 33:
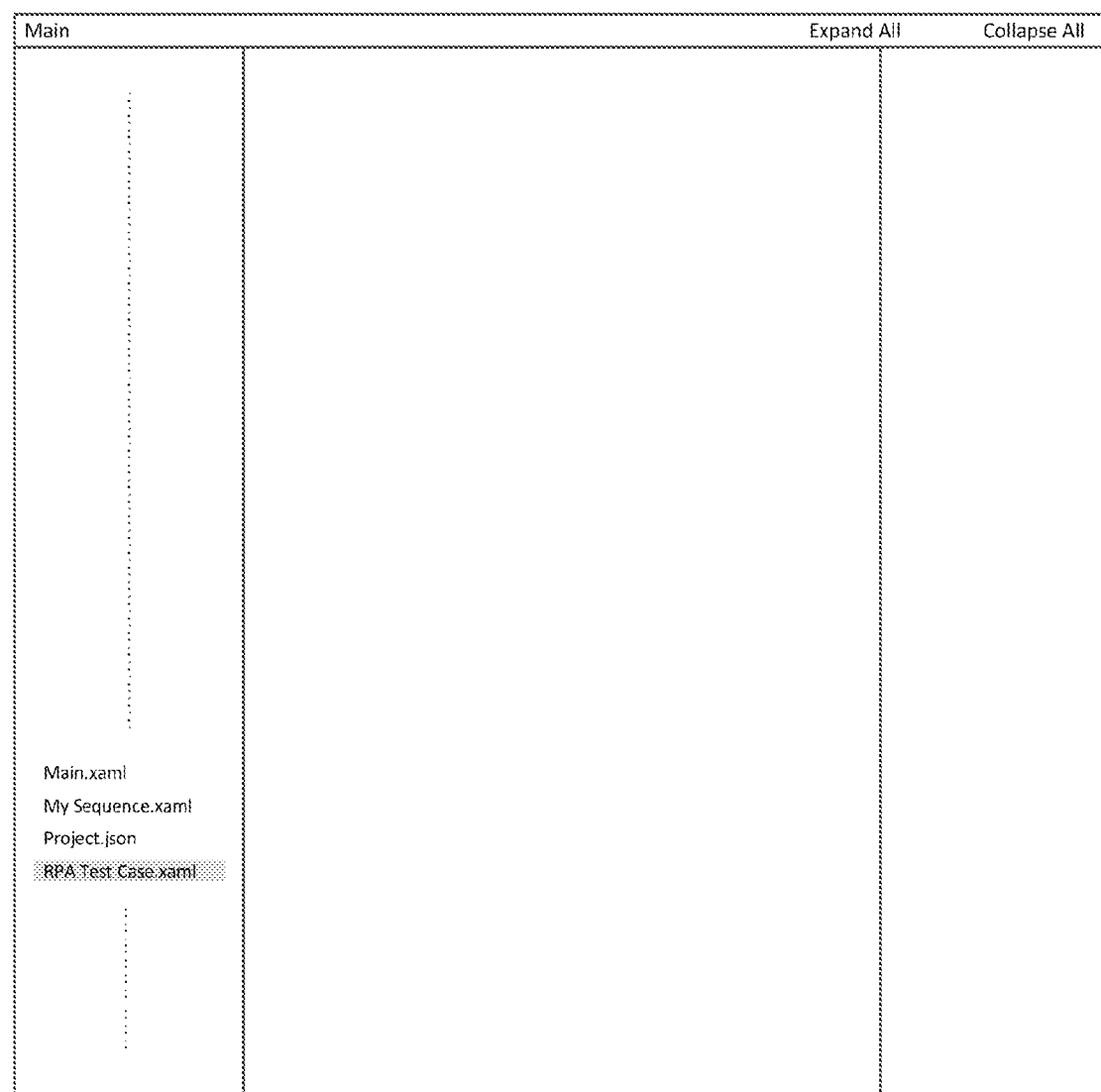
FIG. 33 is a GUI illustrating an application for publishing in Studio Pro®, according to an embodiment of the present invention.

FIG. 7 is a flow diagram illustrating a process 700 for publishing a test case, according to an embodiment of the present invention. In some embodiments, with Studio Pro®, users can publish either their workflows, or their test cases. Once published, users can take the one or more test cases and group them together to test sets for execution. Process 700 may begin at 702 with creating one or more test cases in Studio Pro®, and at 704, the one or more test cases are set to be publishable. See, for example, FIG. 32, which is a GUI 3200 illustrating a menu option to set the one or more test cases to be publishable, according to an embodiment of the present invention. At 706, the one or more test cases are triggered for publishing. See, for example, FIG. 33, which is a GUI 3300 illustrating an application for publishing in Studio Pro®, according to an embodiment of the present invention.

At 708, a process is created for the test case package using a certain environment. See, for example, FIG. 34, which is a GUI 3400 illustrating a deployment process, according to an embodiment of the present invention. At 710, the one or more test cases appear in the 'Test Cases' section of Studio Pro®. See, for example, FIG. 35, which is a GUI 3500 illustrating the created test cases in the 'Test Case' section, according to an embodiment of the present invention.

Workflow Test Case Execution

Executing workflow test cases is not different from executing application test cases. For example, FIG. 8 is a flow diagram illustrating a process 800 for executing a test case, according to an embodiment of the present invention. In some embodiments, process 800 may begin at 802 with creating a test set, and at 804, assigning one or more test cases for one or more workflows, or one or more parts of the workflow, to the test set. At 806, the test set is executed.

Figure 20:
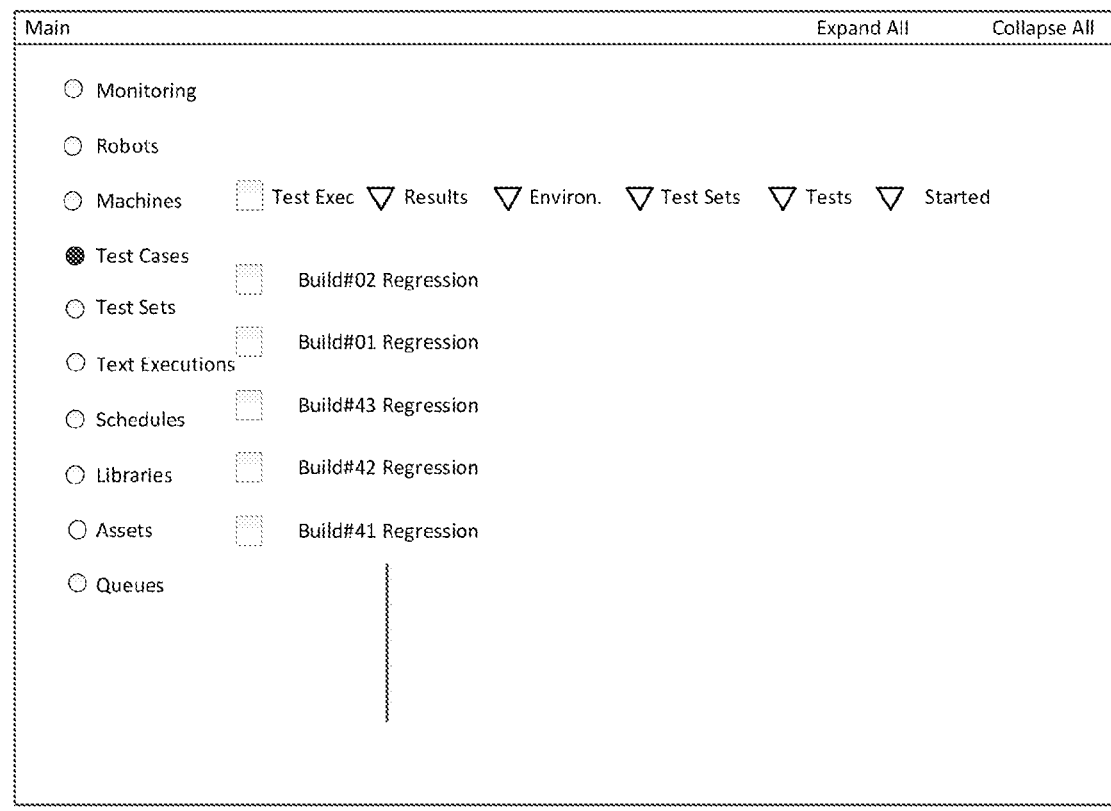
FIG. 20 is a GUI illustrating test results from executed workflow test cases, according to an embodiment of the present invention.

It should be appreciated that the execution result of workflow test cases may have a similar structure as common application test results, but additionally may have a reference to the process under test. FIG. 20 is a GUI 2000 illustrating test results from executed workflow test cases, according to an embodiment of the present invention.

Figure 21:
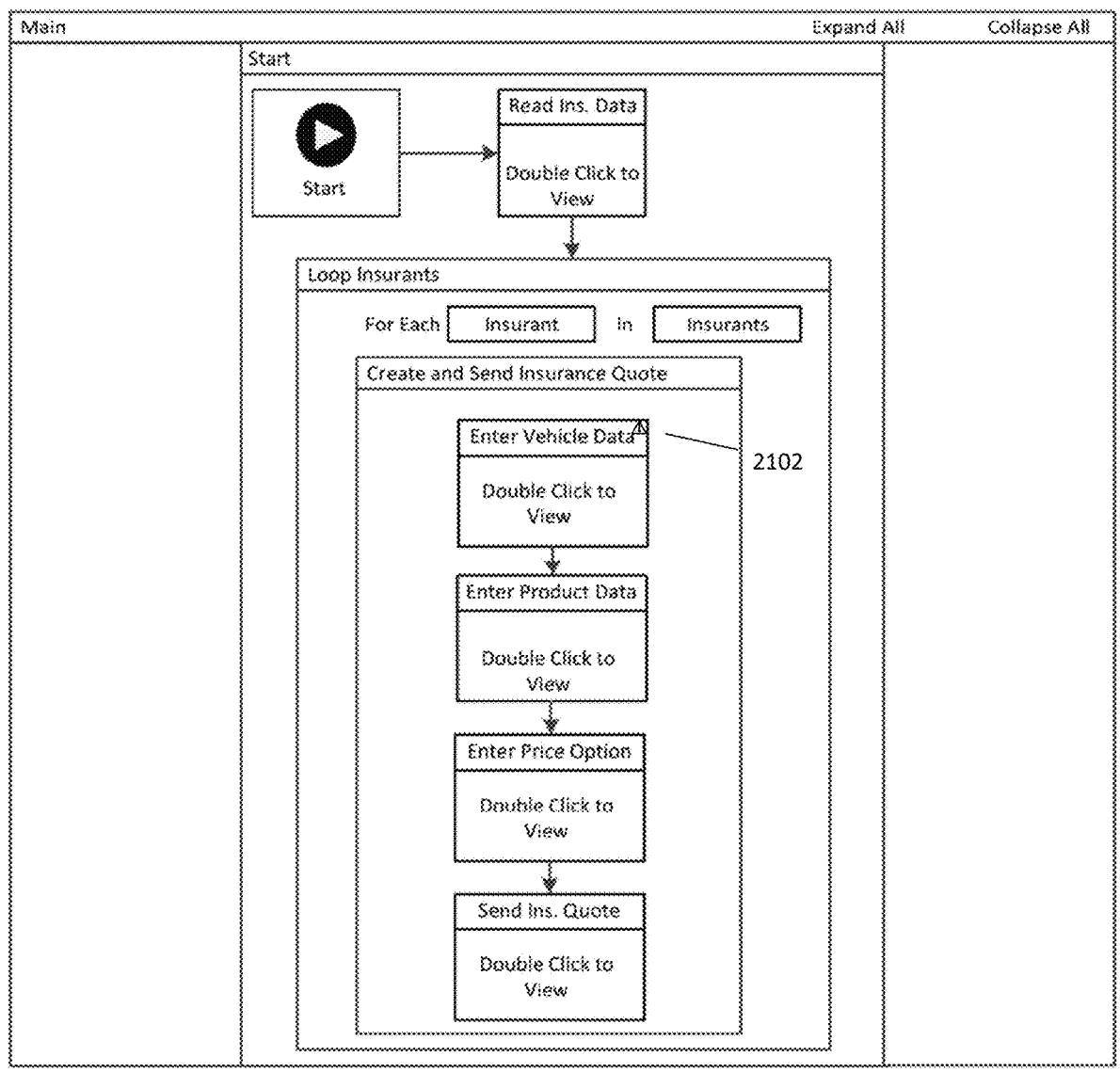
FIG. 21 is a GUI illustrating the 'Process' section of Orchestrator™ according to an embodiment of the present invention.

In case of a failed workflow test case, the corresponding processes within the 'Process' section of Orchestrator™ receives a warning triangle and tooltip. FIG. 21 is a GUI 2100 illustrating the 'Process' section of Orchestrator™, according to an embodiment of the present invention. In an embodiment, warning triangle and tooltip 2102 provides an indication that a particular process is affected by the failed workflow test case and may require adaptions to run successfully during production.

When considering that one or more users may continuously run one or more workflow test cases for the latest version of a workflow within a dedicated test environment, the actual process in production uses the previous version and a different environment. For example, during development of a RPA, there is a first version and then a second version. For this second version, test cases are executed when there is a change in the workflow. In another example, when the second version is under production, a set of workflow test cases are also executed during production. For instance, the test cases are executed once per day prior to running the workflow in production. With this, workflows under test can be broken and fixed prior to the workflow entering the production stage. For purposes of explanation, the term 'environment' refers to the system, i.e., the programming, the databases, etc. In other words, there are many environments, starting with development environment, and pre-production environment, production environment, to name a few.

For this reason, it may be beneficial to warn or notify users about potential issues within this process. Therefore, tooltip or notification message 2102 may provide the necessary context. For example, tooltip or notification message 2102 may include the following message: "Several Test Cases assigned to this process failed for version XXX on environment Y" A context menu in some embodiments allows marking the warning as 'received' which basically removes the warning.

Figure 22:
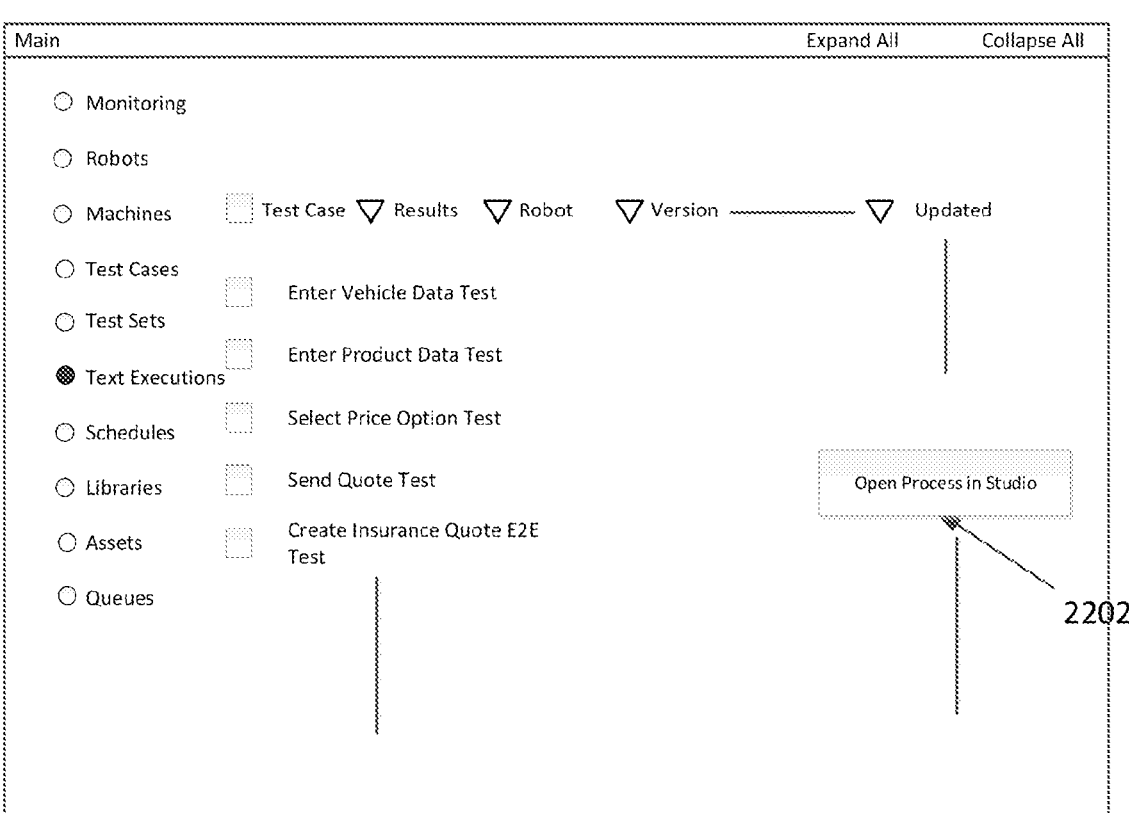
FIG. 22 is a GUI illustrating a menu option to open the workflow in Studio™, according to an embodiment of the present invention.
Figure 23:
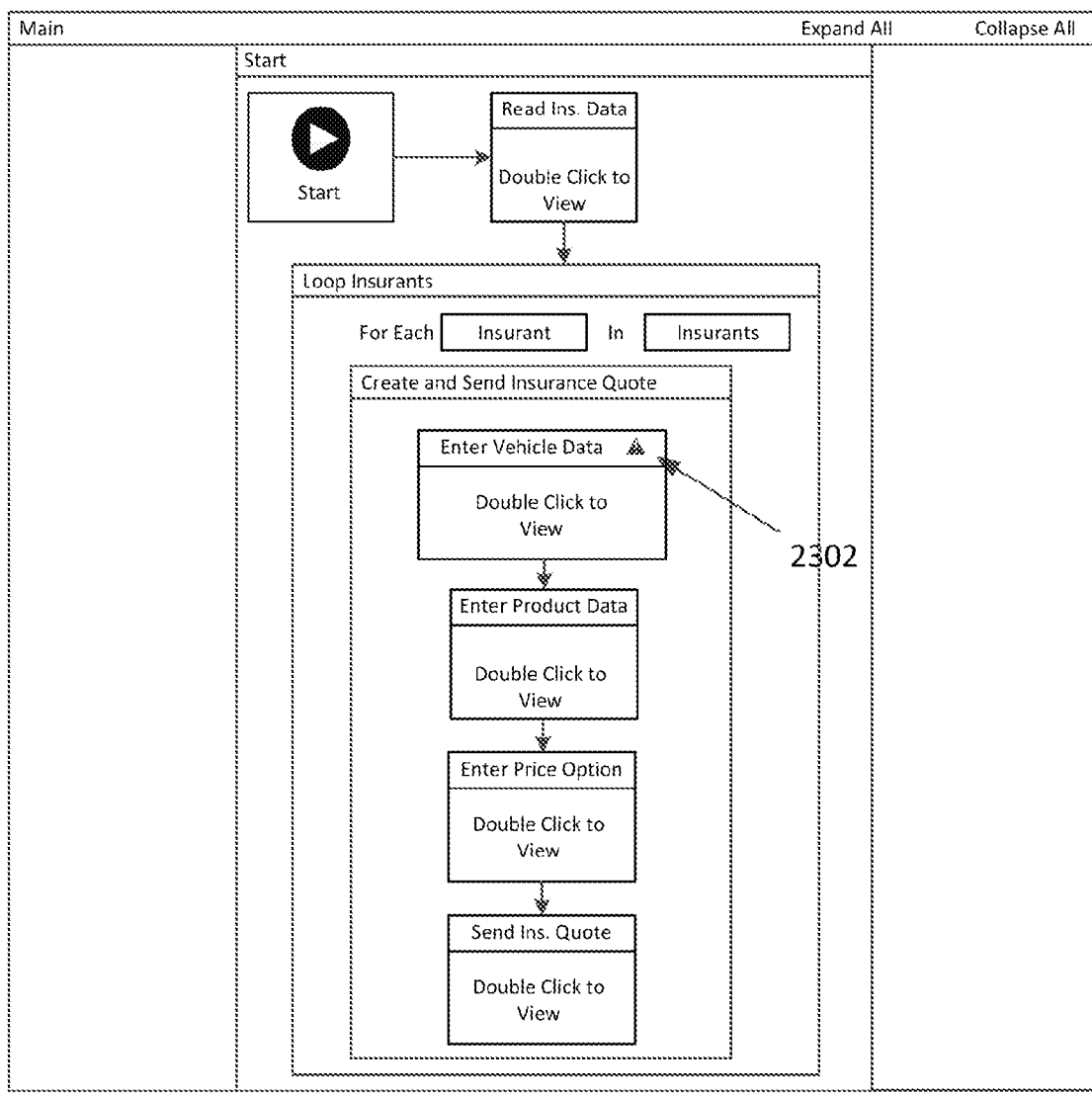
FIG. 23 is a GUI illustrating affected workflow and a test case in Studio™, according to an embodiment of the present invention.

In certain embodiments, a failed workflow test case causes the developer to analyze the workflow and/or test case and debug the workflow and/or testcase in Studio Pro™. Therefore, an additional context menu entry, such as that shown in FIG. 22, allows for directly opening up of the corresponding Studio Pro™ project. FIG. 22 is a GUI 2200 illustrating an additional context menu entry 2202 to open the failed workflow test case in Studio™, according to an embodiment of the present invention. FIG. 23 is a GUI 2300 illustrating affected workflow 2302 and a test case in Studio Pro™, according to an embodiment of the present invention.

Create Data-Driven Workflow Test Cases

Figure 24:
FIG. 24 is a GUI illustrating a table within Excel®, according to an embodiment of the present invention.

In some embodiments, testing different combinations of input data requires a possibility to connect an external data source with a test case. In one example, let's assume the data source is a table within an Excel® sheet. See, for example, FIG. 24, which is a GUI 2400 illustrating a table within Excel®, according to an embodiment of the present invention.

Figure 9:
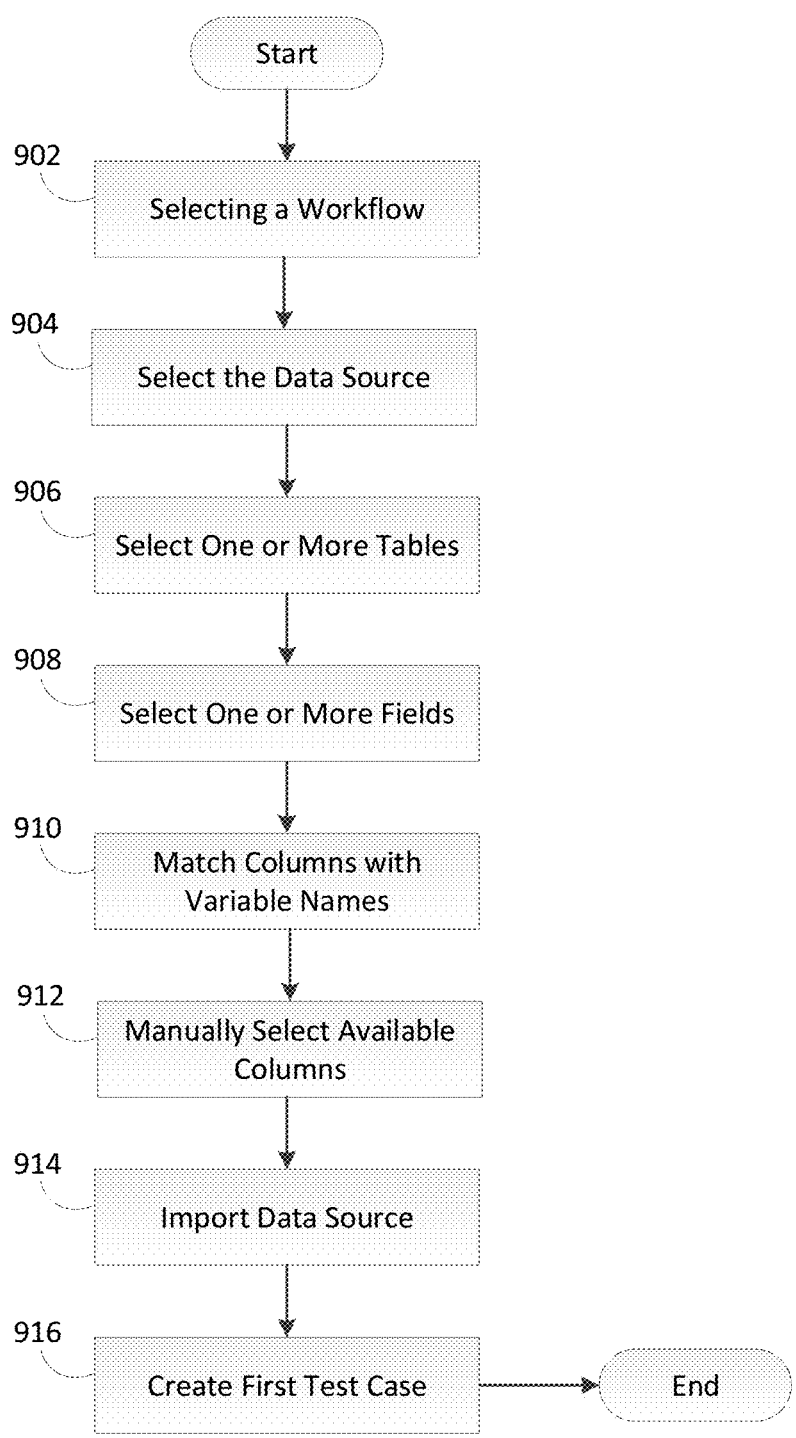
FIG. 9 is a flow diagram illustrating a process for creating a data-driven workflow test case, according to an embodiment of the present invention.
Figure 25:
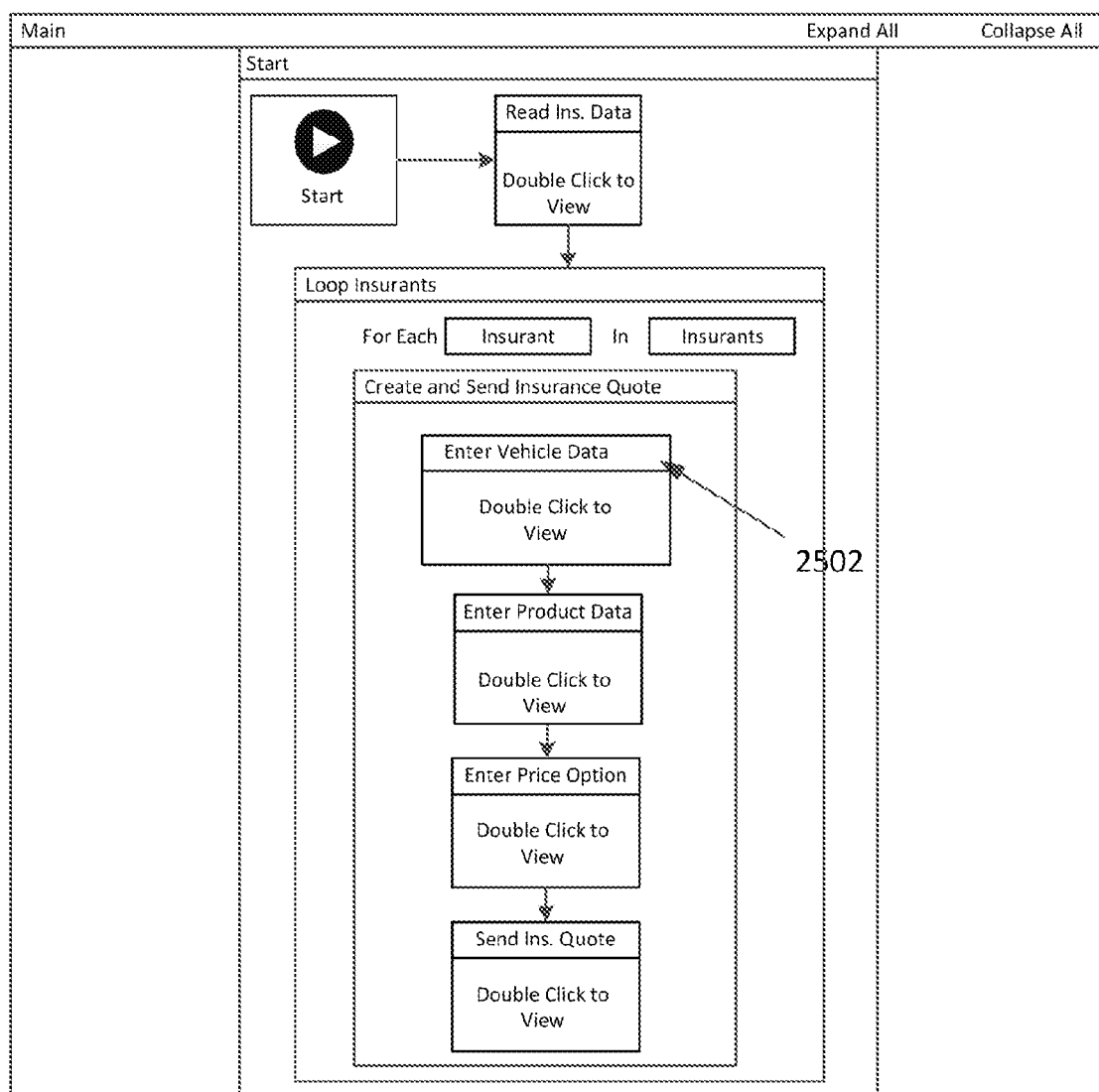
FIG. 25 is a GUI illustrating a workflow that is to be selected, according to an embodiment of the present invention.
Figure 26:
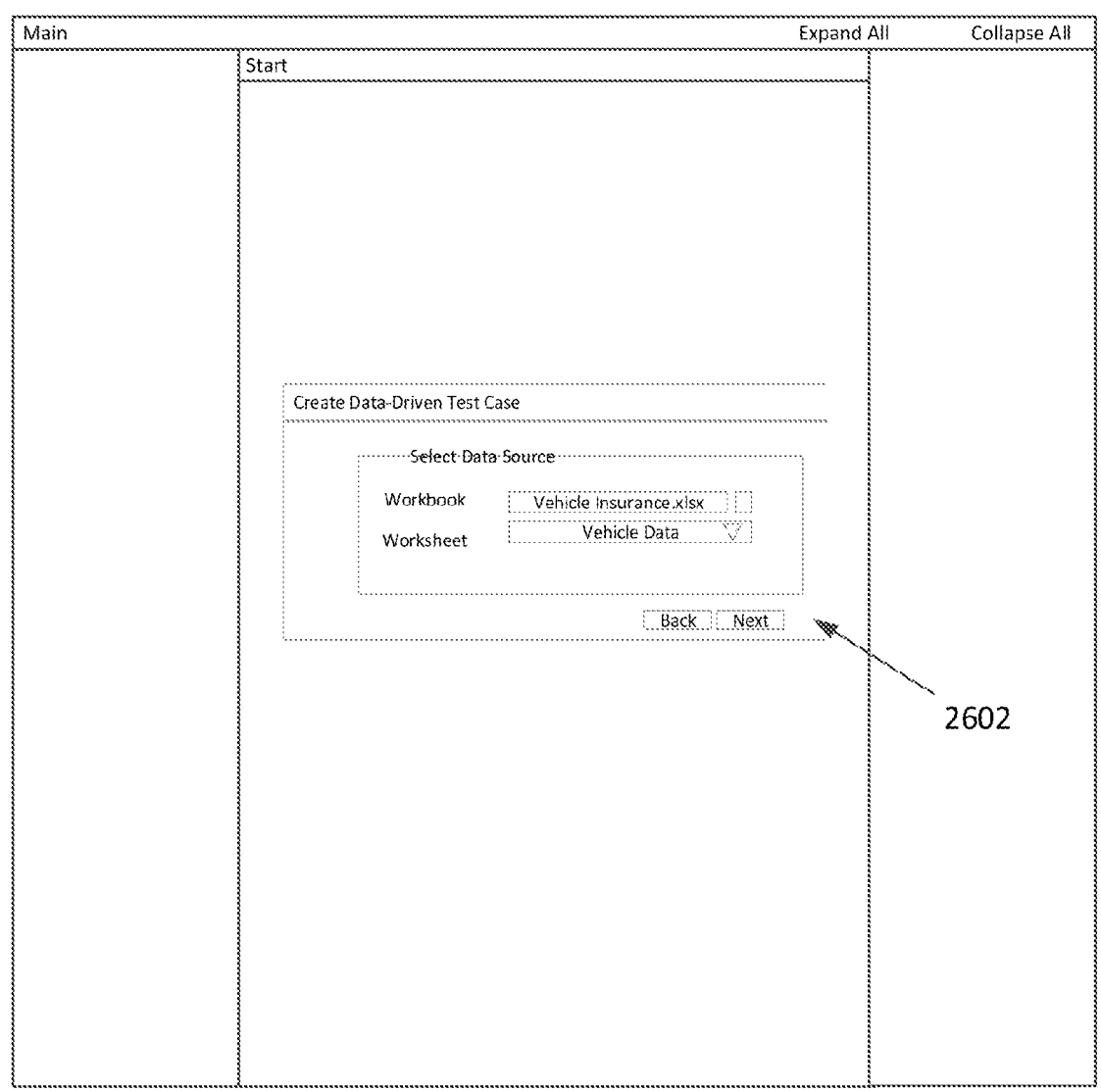
FIG. 26 is a GUI illustrating a 'Data-Driven Test Case' menu allowing a user to select the data source, according to an embodiment of the present invention.

FIG. 9 is a flow diagram illustrating a process 900 for creating a data-driven workflow test case, according to an embodiment of the present invention. In some embodiments, process 900 may begin at 902 with selecting the workflow, or one or more parts of the workflow, in Studio Pro™. This way, the data in the data source, in this example being in the form of an Excel® sheet is leveraged. FIG. 25 is a GUI 2500 illustrating a workflow 2502 that is to be selected, according to an embodiment of the present invention. At 904, from the 'Workflow Testing' section, the 'Create Data-Driven Test Case' is selected and the data source is selected. FIG. 26 is a GUI 2600 illustrating a 'Data-Driven Test Case' menu 2602 allowing a user to select the data source, according to an embodiment of the present invention.

Figure 27:
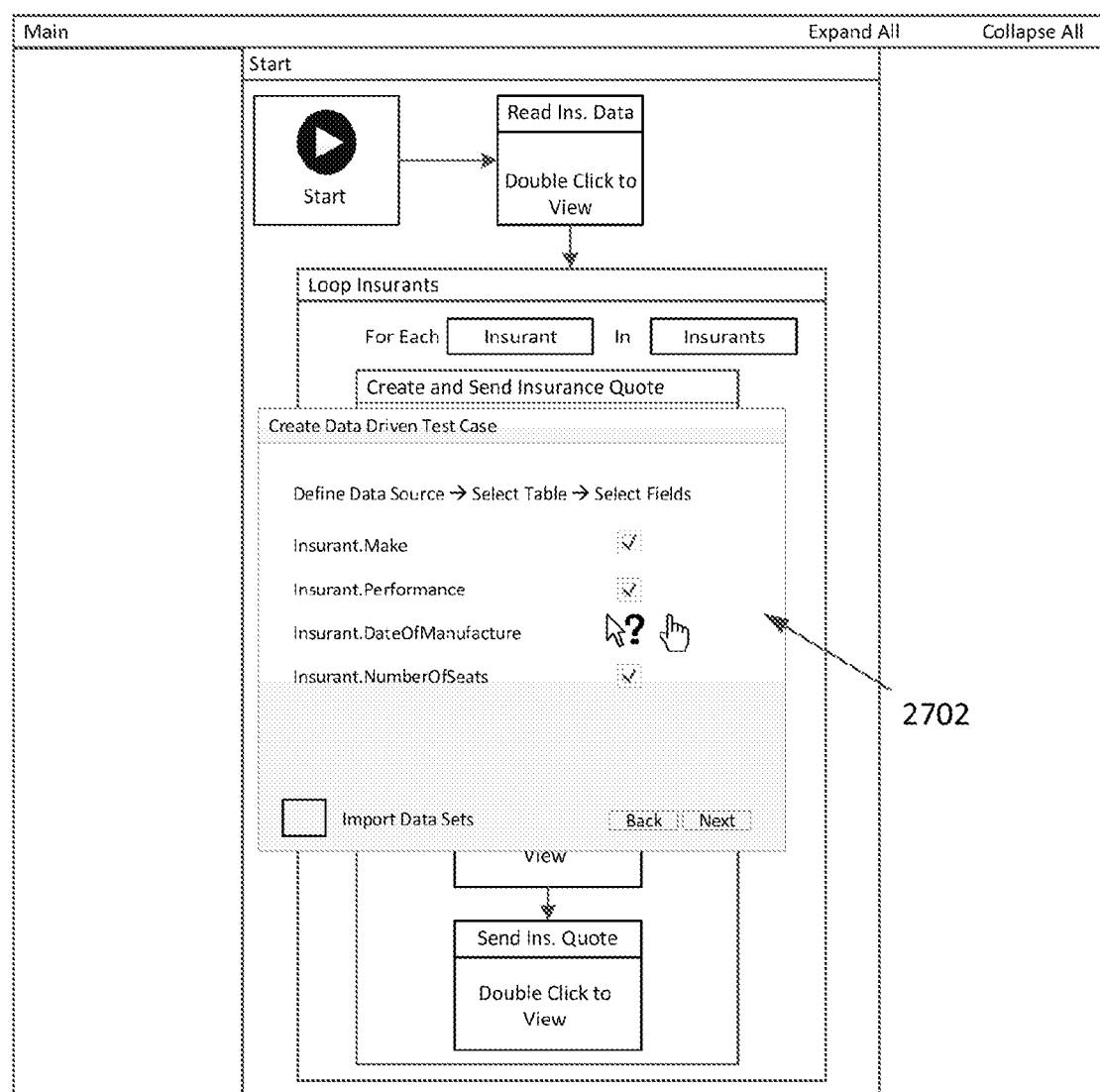
FIG. 27 is a GUI illustrating a menu option allowing fields to be selected, according to an embodiment of the present invention.

At 906, under a 'Select Table' menu, one or more tables are selected. Once the table(s) are selected, the fields are selected at 908. FIG. 27 is a GUI 2700 illustrating a menu option 2702 allowing fields to be selected, according to an embodiment of the present invention. Specifically, GUI 2700 shows a menu option 2702 that allows a user to select one or more fields from the data source in the Excel® sheet. It is from these fields the data is extracted. At 910, since the data source is an Excel® sheet, Studio Pro™ automatically matches the columns with the variable names used.

Figure 28:
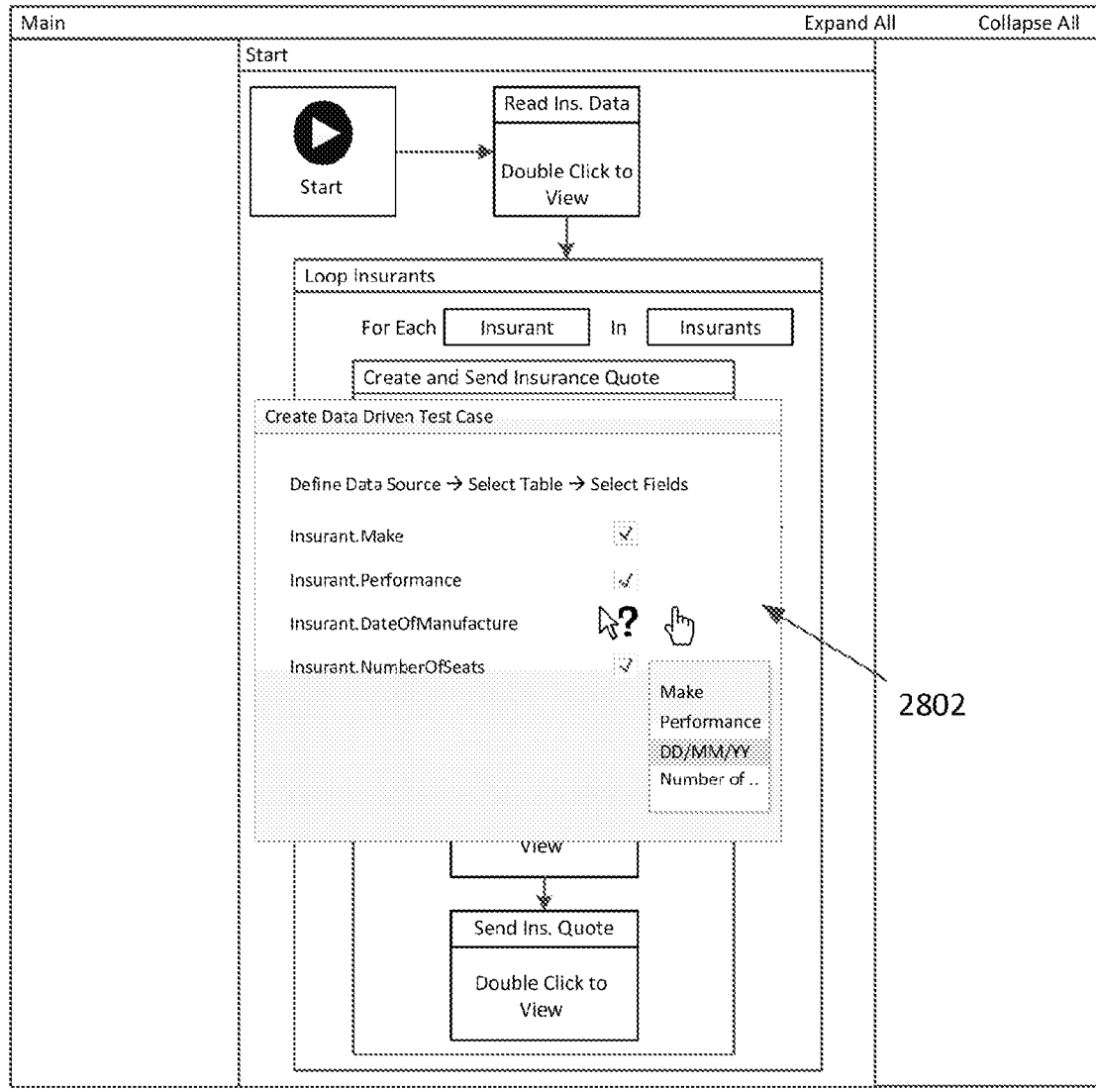
FIG. 28 is a GUI illustrating a menu option for allowing a user to select one or more available columns within the selected Excel® sheet, according to an embodiment of the present invention.

At 912, for those variables that cannot be matched with a certain column, the user manually selects from available columns within the selected sheet. FIG. 28 is a GUI 2800 illustrating a menu option 2802 for allowing a user to select one or more available columns within the selected Excel® sheet, according to an embodiment of the present invention.

Figure 29:
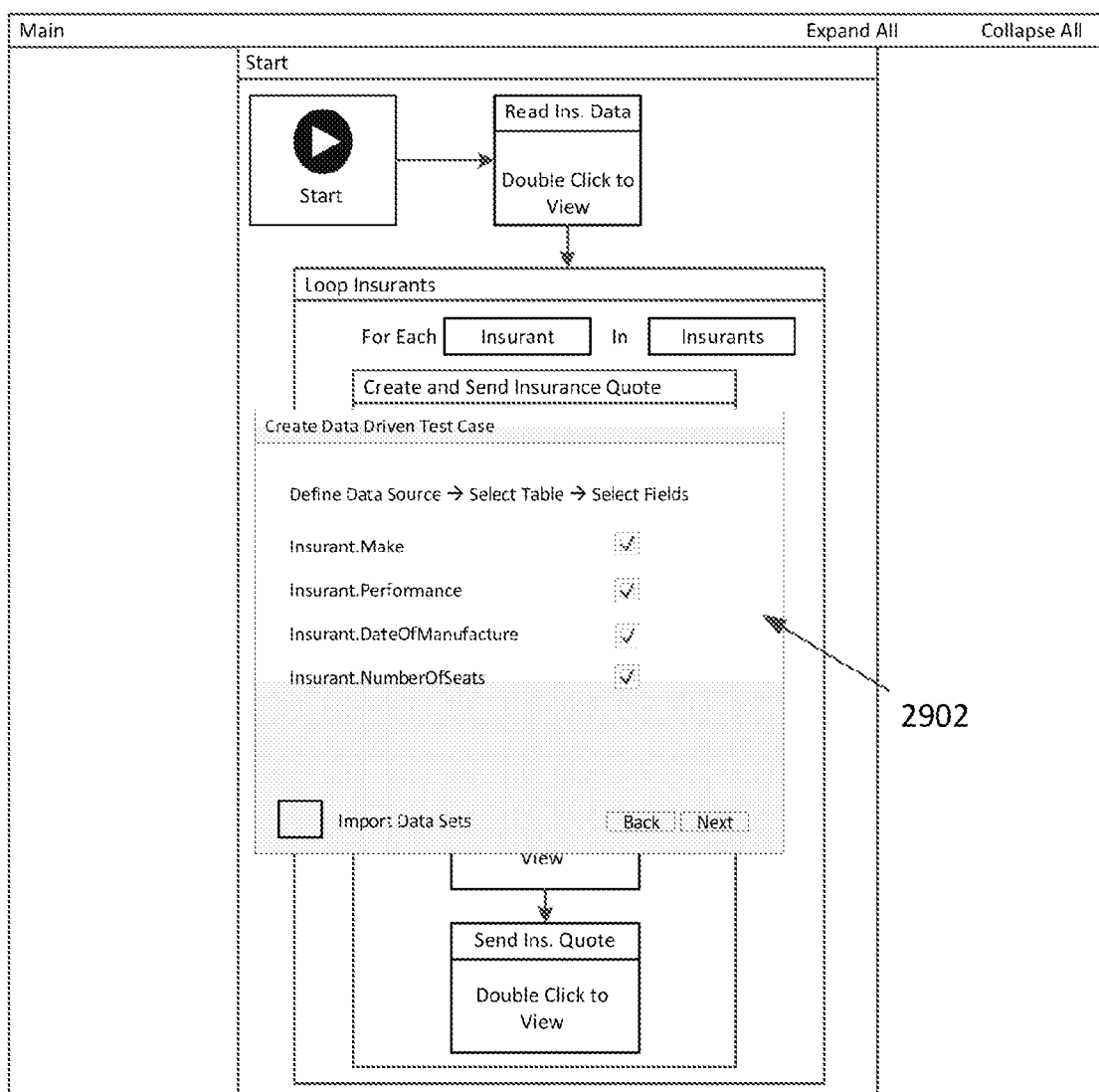
FIG. 29 is a GUI illustrating a menu option showing an option to select 'Import Data Set', according to an embodiment of the present invention.

At 914, the data source is imported by selected on the 'Import Data Set' checkbox in Studio Pro™. It should be noted that depending on the embodiment, the data source is either referenced (by path) or imported as part of the project (e.g., by clicking on the 'Import Data Set' checkbox in the menu option). FIG. 29 is a GUI 2900 illustrating a menu option 2902 showing an option to select 'Import Data Set', according to an embodiment of the present invention. In some embodiments, the data set is part of the project itself and the initial source (file) does not have to be available during test execution.

Figure 30:
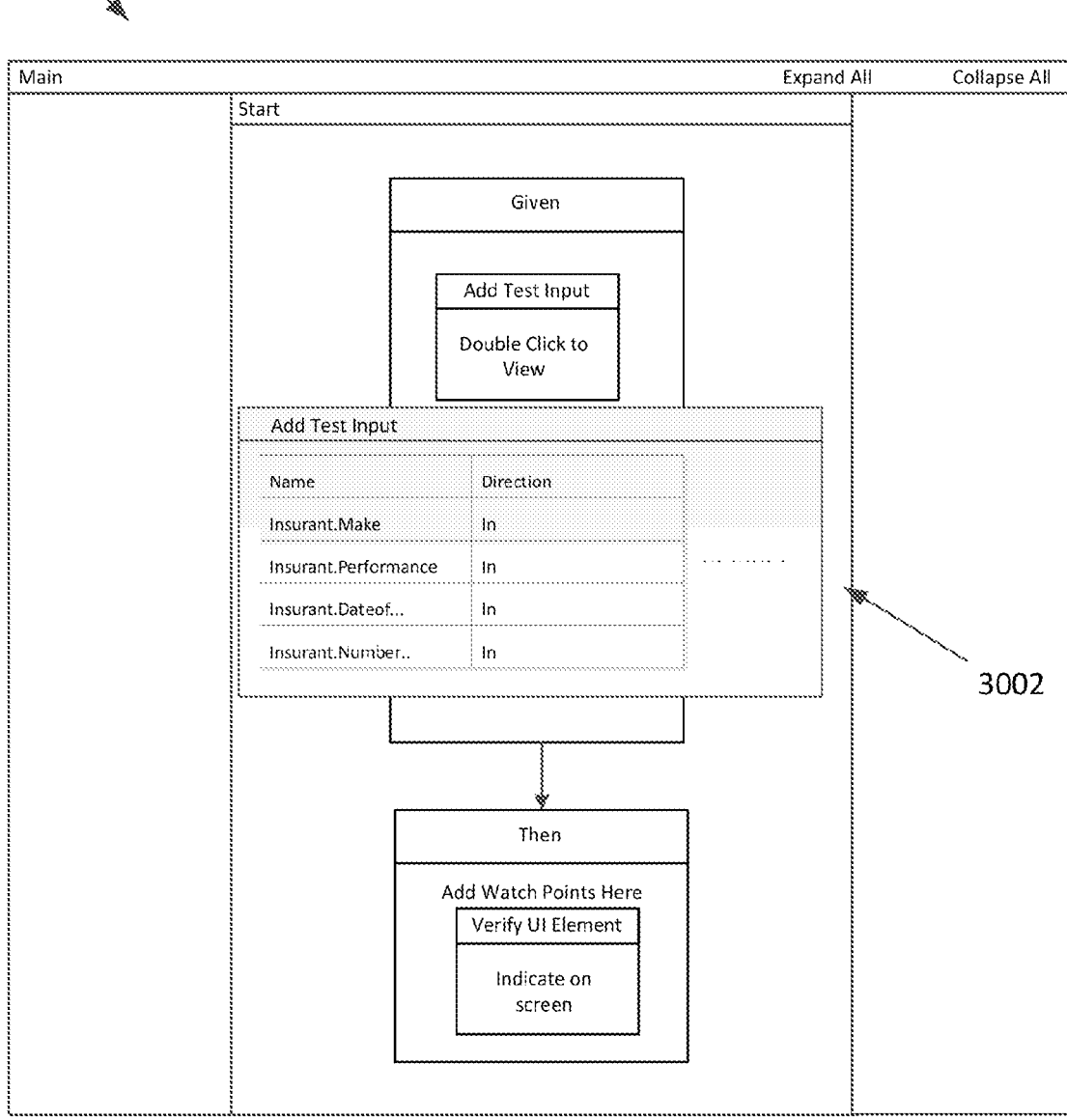
FIG. 30 is a GUI illustrating a first test case created from the data set, according to an embodiment of the present invention.

At 916, after variable matching is complete, the first test case is created and the variables within the 'Arguments' section are set with references to the data source (external or internal). FIG. 30 is a GUI 3000 illustrating a first test case 3002 created from the data set, according to an embodiment of the present invention.

FIG. 31 is a GUI 3100 illustrating a test case with multiple test data variations, according to an embodiment of the present invention. In some embodiments, a new tab called 'Data Sets' may be created showing a table with the imported test data. This table has mainly two purposes. First, the table indicates the single test case is connected to multiple test data variations. Second, the table executes one or more of the variations (e.g., by selecting one or more variations and clicking 'Run') for debugging purposes locally. For example, when publishing to Orchestrator™, the entire data set is published and is executed.

The process steps performed in FIGS. 6-9 may be performed by a computer program, encoding instructions for the processor(s) to perform at least part of the process(es) described in FIGS. 6-9, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 6-9, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
creating, by at least one processor, a test case for one or more parts of a workflow under test, wherein the one or more parts of the workflow under test is a workflow in production or a workflow under development, wherein the workflow under test performs a series of steps on a plurality of applications, and the test case uses a 'given-when-then' template; and
invoking, using a 'when' module by the test case, the one or more parts of the workflow under test, wherein the invoking of the one or more parts of the workflow under test comprising:
  referencing, by the test case, the one or more parts of the workflow under test when executing the workflow under test avoids the test case from holding a copy of the one or more parts of the workflow under test;
  executing, using the 'when' module, the test case for the one or more parts of the workflow under test, to identify environmental and/or automation issues with the one or more parts of the workflow under test; and
  reporting a failed workflow test when the environmental and/or automation issues are identified.

2. The computer-implemented method of claim 1, further comprising:
opening the one or more parts of the workflow under test within an application; and
selecting the one or more parts of the workflow under test to determine a scope of the test case.

3. The computer-implemented method of claim 1, wherein the creating of the test case is based on the 'given-when-then' template,
the 'given-when-then' template invoking the one or more parts of the workflow under test, executing an application with one or more required pre-conditions, and holding one or more types of assertions, and
the 'given-when-then' template comprises the 'when' module, a 'given' module, and a 'then' module.

4. The computer-implemented method of claim 3, wherein the 'when' module invoking the one or more parts of the workflow under test and placing the one or more parts of the workflow under test as a reference, allowing for the test case to reference the one or more parts of the workflow under test.

5. The computer-implemented method of claim 3, wherein the 'given' module adding one or more required preconditions for the 'when' module to successfully execute the one or more parts of the workflow under test, the one or more preconditions comprise one or more input parameters and one or more applications used by the one or more parts of the workflow under test.

6. The computer-implemented method of claim 5, wherein the 'given' module providing a possibility to mock steps of the one or more parts of the workflow under test, ensuring that the one or more parts of the workflow under test is executed without errors, the mocking of the steps includes simulating a series of steps within the one or more parts of the workflow under test, and the one or more parts of the workflow under test is a test object for which test cases are created for and are invoked by the 'when' module.

7. The computer-implemented method of claim 5, wherein the 'given' module automatically identifying one or more variables and/or one or more parameters required for the one or more parts of the workflow under test to be executed.

8. The computer-implemented method of claim 5, wherein the 'given' module automatically creating a variable with same name as the one or more parts of the workflow under test when the test case is created for the one or more parts of the workflow under test.

9. The computer-implemented method of claim 3, wherein the 'then' module verifying the one or more parts of the workflow under test and implementing one or more existing verification activities from a user.

10. The computer-implemented method of claim 1, further comprising:
publishing the test case referencing the one or more parts of the workflow under test for which the test case was created; and
grouping the test case with one or more other test cases to create a test set for execution.

11. A system, comprising:
memory storing computer program instructions; and
at least one processor configured to execute the computer program instructions, the computer program instructions are configured to execute:
creating a test case for one or more parts of a workflow under test, wherein the one or more parts of the workflow under test is a workflow in production or a workflow under development, wherein the workflow under test performs a series of steps on a plurality of applications, and the test case uses a 'given-when-then' template; and
invoking, using a 'when' module by the test case, the one or more parts of the workflow under test, wherein the invoking of the one or more parts of the workflow under test comprising:
referencing, by the test case, the one or more parts of the workflow under test when executing the workflow under test avoids the test case from holding a copy of the one or more parts of the workflow under test;
executing, using the 'when' module, the test case for the one or more parts of the workflow under test, to identify environmental and/or automation issues ferwith the one or more parts of the workflow under test; and
reporting a failed workflow test when the environmental and/or automation issues are identified.

12. The system of claim 11, wherein the computer program instructions are further configured to execute:
opening the one or more parts of the workflow under test within an application; and
selecting the one or more parts of the workflow under test to determine a scope of the test case.

13. The system of claim 11, wherein the creating of the test case is based on the 'given'-when-then' template,
the 'given-when-then' template being configured to invoke the one or more parts of the workflow under test, execute an application with one or more required pre-conditions, and hold one or more types of assertions, and
the 'given-when-then' template comprises the 'when' module, a 'given' module, and a 'then' module.

14. The system of claim 13, wherein the 'when' module is configured to invoke the one or more parts of the workflow under test and place the one or more parts of the workflow under test as a reference, allowing for the test case to reference the one or more parts of the workflow under test.

15. The system of claim 13, wherein the 'given' module is configured to add one or more required preconditions for the 'when' module to successfully execute the one or more parts of the workflow under test,
the one or more preconditions comprise one or more input parameters and one or more applications used by the one or more parts of the workflow.

16. The system of claim 15, wherein the 'given' module is configured to provide a possibility to mock steps of the one or more parts of the workflow under test, ensuring that the one or more parts of the workflow under test is executed without errors,
the mocking of the steps includes simulating a series of steps within the one or more parts of the workflow under test,
the one or more parts of the workflow under test is a test object for which test cases are created for and are invoked by the 'when' module.

17. The system of claim 15, wherein the 'given' module is configured to automatically identify one or more variables and/or one or more parameters required for one or more parts of the workflow to be executed.

18. The system of claim 15, wherein the 'given' module is configured to automatically create a variable with same name as the one or more parts of the workflow under test when the test case is created for the one or more parts of the workflow under test.

19. The system of claim 13, wherein the 'then' module is configured to verify the one or more parts of the workflow under test and implement one or more existing verification activities from a user.

20. The system of claim 11, wherein the computer program instructions are further configured to execute:
publishing the test case referencing the one or more parts of the workflow under test for which the test case was created; and
grouping the test case with one or more other test cases to create a test set for execution.

* * * * *